US008182331B2

(12) United States Patent
Okada

(10) Patent No.: US 8,182,331 B2
(45) Date of Patent: May 22, 2012

(54) GAMING MACHINE

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 577 days.

(21) Appl. No.: 12/402,895

(22) Filed: Mar. 12, 2009

(65) Prior Publication Data

US 2009/0233712 A1 Sep. 17, 2009

Related U.S. Application Data

(60) Provisional application No. 61/035,898, filed on Mar. 12, 2008.

(51) Int. Cl.
*A63F 13/00* (2006.01)
*A63F 13/02* (2006.01)
*G06F 17/28* (2006.01)

(52) U.S. Cl. .............................. 463/20; 463/35; 463/36

(58) Field of Classification Search ................ 463/8, 17, 463/35, 43, 20, 36
See application file for complete search history.

(56) References Cited

U.S. PATENT DOCUMENTS 7,335,104 B2 * 2/2008 Benbrahim .................... 463/35
2007/0033040 A1 2/2007 Huang et al.
2007/0094004 A1 4/2007 Huang et al.
2007/0094005 A1 4/2007 Huang et al.
2007/0094006 A1 4/2007 Todhunter et al.
2007/0094007 A1 4/2007 Huang et al.
2007/0094008 A1 4/2007 Huang et al.
2007/0259716 A1 * 11/2007 Mattice et al. .................. 463/36
2007/0259717 A1 * 11/2007 Mattice et al. .................. 463/36
2009/0124350 A1 * 5/2009 Iddings et al. .................. 463/25
2009/0203438 A1 * 8/2009 Okada ............................ 463/30
2009/0203442 A1 * 8/2009 Okada ............................ 463/36
2009/0204388 A1 * 8/2009 Okada .............................. 704/3
2009/0204391 A1 * 8/2009 Okada .............................. 704/9
2009/0215513 A1 * 8/2009 Okada ............................ 463/17
2009/0215514 A1 * 8/2009 Okada ............................ 463/17
2009/0221341 A1 * 9/2009 Okada ............................ 463/17
2009/0228282 A1 * 9/2009 Okada .......................... 704/277
2009/0233690 A1 * 9/2009 Okada ............................ 463/20
2011/0212765 A1 * 9/2011 Walker et al. .................. 463/25
* cited by examiner

*Primary Examiner* — Evan Pert
(74) *Attorney, Agent, or Firm* — NDQ&M Watchstone LLP

(57) ABSTRACT

A gaming machine executes a second game based on game results of a first game. The second game is a game that awards a prize corresponding to an option a player selects from a plurality of options. In the second game, based on speech input by the player, the gaming machine identifies a language to be used by the player. Then, the gaming machine provides the player with information based on a game history for the second game. Then, the gaming machine expresses the information based on the game history in the identified language to be used by the player.

4 Claims, 20 Drawing Sheets

FIG. 12

| | of a Kind | | | | | | | | | | | | |
|---|---|---|---|---|---|---|---|---|---|---|---|---|---|
| | 3 | 4 | 5 | 6 | 7 | 8 | 9 | 10 | 11 | 12 | 13 | 14 | 15 |
| RED 7 | 70 | 120 | 200 | 300 | 300 | 300 | 400 | 400 | 400 | 500 | 500 | 500 | 600 |
| BLUE 7 | 60 | 100 | 150 | 250 | 250 | 250 | 300 | 300 | 300 | 400 | 400 | 400 | 500 |
| BELL | — | 15 | 30 | 50 | 110 | 130 | 190 | 210 | — | — | — | — | — |
| EIGHT | — | 10 | 20 | 40 | 90 | 110 | 150 | 180 | — | — | — | — | — |
| WATER MELON | — | 8 | 15 | 30 | 70 | 90 | 130 | 150 | — | — | — | — | — |
| LEMON | — | 12 | 120 | — | — | — | — | — | — | — | — | — | — |
| ORANGE | — | 10 | 100 | — | — | — | — | — | — | — | — | — | — |
| PLUM | — | 10 | 100 | — | — | — | — | — | — | — | — | — | — |
| CHERRY | — | 8 | 80 | — | — | — | — | — | — | — | — | — | — |

FIG. 15

| CODE NUMBER | SYMBOL |
|---|---|
| 00 | RED 7 |
| 01 | CHERRY |
| 02 | PLUM |
| 03 | CHERRY |
| 04 | JOKER |
| 05 | EIGHT |
| 06 | LEMON |
| 07 | BLUE 7 |
| 08 | BELL |
| 09 | ORANGE |
| 10 | WATER MELON |
| 11 | CHERRY |
| 12 | CHERRY |
| 13 | PLUM |
| 14 | RED 7 |
| 15 | ORANGE |
| 16 | BELL |
| 17 | BELL |
| 18 | CHERRY |
| 19 | CHERRY |
| 20 | LEMON |
| ⋮ | ⋮ |

FIG. 16

| RANDOM NUMBER VALUE | CODE NUMBER |
|---|---|
| 0~127 | 00 |
| 128~255 | 01 |
| 256~383 | 02 |
| 384~511 | 03 |
| 512~760 | 04 |
| 761~767 | 05 |
| 768~895 | 06 |
| 896~1023 | 07 |
| 1024~1151 | 08 |
| 1152~1279 | 09 |
| 1280~1307 | 10 |
| 1308~1335 | 11 |
| 1336~1364 | 12 |
| 1365~1491 | 13 |
| 1492~1919 | 14 |
| 1920~2047 | 15 |
| 2048~2175 | 16 |
| 2176~2303 | 17 |
| 2304~2431 | 18 |
| 2432~2559 | 19 |
| 2560~2687 | 20 |
| ⋮ | ⋮ |

FIG. 17

| CARD CONTENT PATTERN | FIRST CARD CONTENT | SECOND CARD CONTENT | THIRD CARD CONTENT | RANDOM NUMBER VALUE RANGE |
|---|---|---|---|---|
| CARD CONTENT PATTERN (1) | JACKPOT | NO BONUS | NO BONUS | 0~170 |
| CARD CONTENT PATTERN (2) | NO BONUS | JACKPOT | NO BONUS | 171~341 |
| CARD CONTENT PATTERN (3) | NO BONUS | NO BONUS | JACKPOT | 342~511 |

FIG. 22

| NO. | FIRST CARD CONTENT | SECOND CARD CONTENT | THIRD CARD CONTENT |
|---|---|---|---|
| 1 | JACKPOT | NO BONUS | NO BONUS |
| 2 | NO BONUS | JACKPOT | NO BONUS |
| 3 | NO BONUS | NO BONUS | JACKPOT |
| 4 | NO BONUS | JACKPOT | NO BONUS |
| 5 | NO BONUS | NO BONUS | JACKPOT |
| 6 | NO BONUS | JACKPOT | NO BONUS |
| 7 | JACKPOT | NO BONUS | NO BONUS |
| ⋮ | ⋮ | ⋮ | ⋮ |

FIG. 23

| ADVICE CONTENT | WINNING PROBABILITY | EXAMPLE OF ADVICE |
|---|---|---|
| ADVICE PATTERN (1) | 80%~100% | RECOMMENDED VERY MUCH. |
| ADVICE PATTERN (2) | 50%~79% | RECOMMENDED. |
| ADVICE PATTERN (3) | 20%~49% | NOT RECOMMENDED SOMEHOW. |
| ADVICE PATTERN (4) | 0%~19% | HONESTLY NOT RECOMMENDED. |

FIG. 24
FIG. 25
3B
BONUS GAME!!
PLEASE SELECT A CARD
130A
130B
130C
ARE YOU SURE?
141
142
YES
NO
140
3B
BONUS GAME!!
PLEASE SELECT A CARD
130A
130B
130C
JACKPO
T
CONGRATULATIONS!!
WIN JACKPOT!!
150

GAMING MACHINE

CROSS-REFERENCE TO RELATED APPLICATIONS

This application is based upon and claims a priority from the U.S. provisional Patent Application No. 61/035,898 filed on Mar. 12, 2008, the entire contents thereof are incorporated herein by reference.

BACKGROUND

1. Technical Field

A gaming machine according to one or more aspect of the present invention relates to a gaming machine that can execute a first game and second game, and, in particular, to a gaming machine that can output an answer to a player.

2. Description of Related Art

Conventionally, conversation control devices that output an answer or response according to speech have been known. For example, these conversation control devices are described in United States Patent Application Publication No. 2007/0094004A1 specification, United States Patent Application Publication No. 2007/0094005A1 specification, United States Patent Application Publication No. 2007/0094006A1 specification, United States Patent Application Publication No. 2007/0094007A1 specification, United States Patent Application Publication No. 2007/0094008A1 specification or United States Patent Application Publication No. 2007/0033040A1 specification.

Additionally, globalization of game arcades, such as casinos, etc., where gaming machines are installed has been progressing. The progress of globalization has led to the situation in game arcades such as casinos, etc., in which players who speak various kinds of languages exist.

Now when players play games with gaming machines, they consider various kinds of information. In particular, information of game history, etc., is very important "information" for players when playing games. Then, gaming machines offer information of game history, etc., to players in certain languages.

Due to the progress of globalization in game arcades, a gaming machine whereby players who speak various kinds of languages can acquire information of game history, etc., is demanded. In addition, the information of game history, etc., varies at any time depending on the situation in which a game is executed, etc.

In this respect, the aforementioned conversation control devices output preset answer statements in a predetermined language, according to speech of players. Thus, the conversation control devices could not quickly cope with diversity of languages and variance of situations. In fact, even if a gaming machine was equipped with the conversation control device, it was still difficult for the gaming machine to offer the information related to game history, etc., to everyone in an appropriate manner.

It is an object of the present invention to provide a gaming machine that enables execution of a game having a game feature that could not be realized in the prior art described above, and that can provide everyone with information based on game history, etc.

SUMMARY

To achieve the aforementioned object, a gaming machine according to one or more aspects of the present invention comprises a memory device, an output device, an input device, a speech recognition device, a character conversion device, a speech conversion device, and a processor. Then, the gaming machine executes a first game. In the first game, if a predetermined condition is satisfied, the gaming machine executes a second game. In the second game, the gaming machine accepts a player's selection from a plurality of options. The gaming machine awards a prize for the second game based on the player's selection. In this second game, the gaming machine accepts the player's speech input to the input device. Based on the input player's speech, the gaming machine identifies a language to be output to the player. Then, the gaming machine outputs commentary information on game history related to the presented plurality of options according to the identified language. Hence, the gaming machine can reliably provide information on game history to players who speak different kinds of languages. With this, the gaming machine enables players speaking different kinds of languages to fully enjoy games related to the gaming machine.

A gaming machine according to one or more aspects of the present invention comprises a memory device, an output device, an input device, a speech recognition device, a character conversion device, a speech conversion device, and a processor. Then, the gaming machine executes a first game. In the first game, if a predetermined condition is satisfied, the gaming machine executes a second game. In the second game, the gaming machine accepts a player's selection for a plurality of options. The gaming machine awards a prize for the second game based on the player's selection. In this second game, the gaming machine accepts the player's speech input to the input device. Based on the input player's speech, the gaming machine identifies a language to be output to the player. The gaming machine calculates the historical frequency of occurrence that the first prize is associated with the option, based on the game history information. And, the gaming machine extracts commentary information on the game history associated with the calculated historical frequency of occurrence. Then, the gaming machine outputs commentary information on the extracted game history according to the identified language. Hence, the gaming machine can reliably provide information on game history to players who speak different kinds of languages. With this, the gaming machine enables players speaking different kinds of languages to fully enjoy games related to the gaming machine. The commentary information on game history is extracted based on the historical frequency of occurrence that the first prize is associated with the option. Thus, players can enjoy a game of the gaming machine more.

BRIEF DESCRIPTION OF THE DRAWINGS

FIG. 12 is an illustration showing a payout table of the slot machine.

FIG. 15 is an illustration showing a table that associates code numbers with symbols.

FIG. 16 is an illustration showing a table that associates random number values with code numbers.

FIG. 17 is an illustration on a card content determination table.

FIG. 22 is an illustration showing content of game history information stored in the RAM 43.

FIG. 23 is an illustration showing one example of an advice content specifying table.

DETAILED DESCRIPTION

Figure 1:
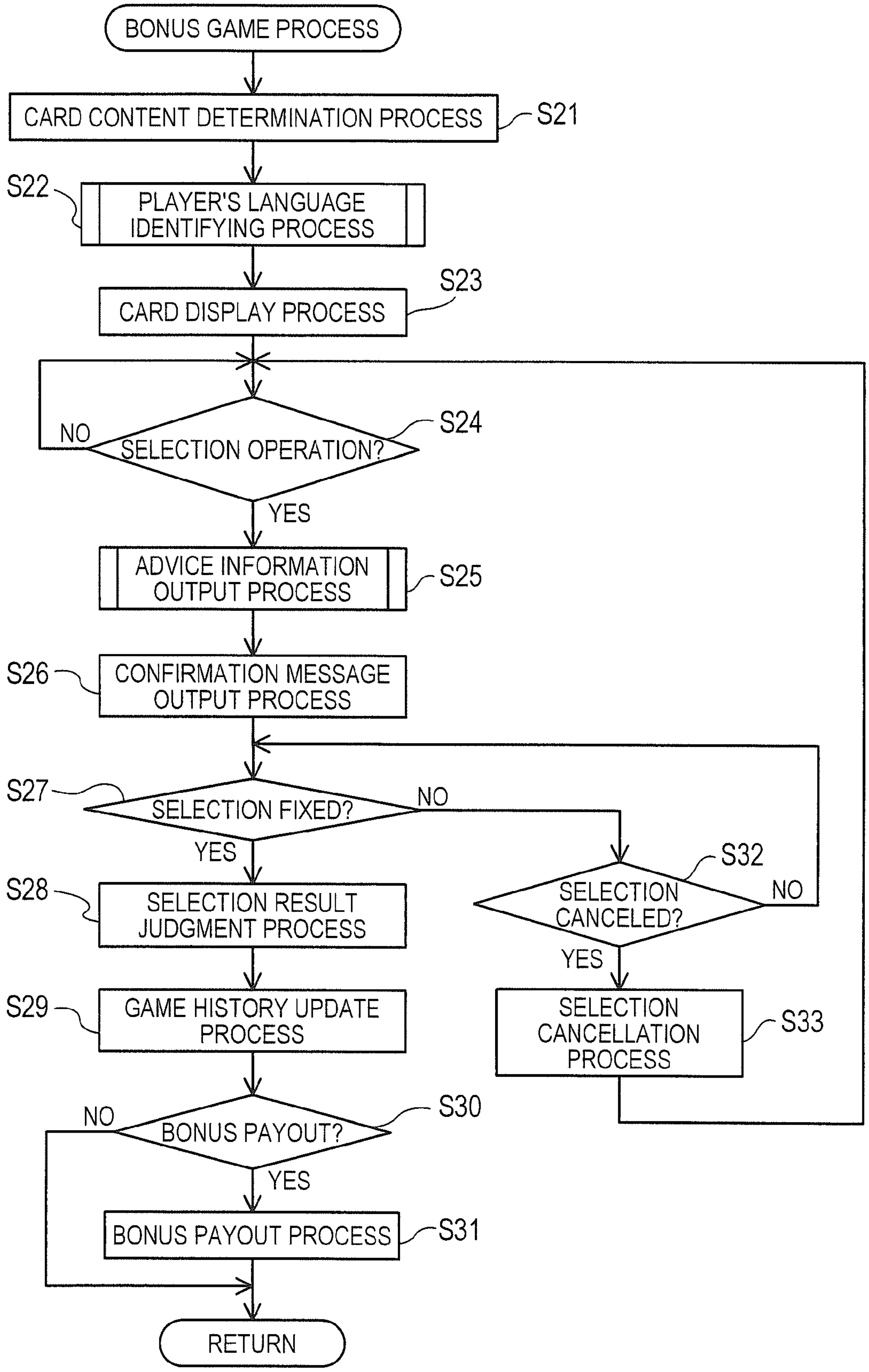
FIG. 1 is a flow chart of bonus game processing program in one embodiment of the present invention.

The various aspects summarized previously may be embodied in various forms. The following description shows by way of illustration of various combinations and configurations in which the aspects may be practiced. It is understood that the described aspects and/or embodiments are merely examples, and that other aspects and/or embodiments may be utilized and structural and functional modifications may be made, without departing from the scope of the present disclosure.

It is noted that various connections are set forth between items in the following description. It is noted that these connections in general and, unless specified otherwise, may be direct or indirect and that this specification is not intended to be limiting in this respect.

A gaming machine, a server, and a game system according to one or more aspects of the invention will be described in detail with reference to the drawings based on an embodiment embodying one or more aspects of the invention. However, it is appreciated that one or more aspects of the present invention may be embodied in distributable (via CD and the like) or downloadable software games, console games, and the like. In this regard, the slot machine may be a virtual slot machine that is displayed on a multi-purpose computer and/or dedicated kiosk. Aspects of the invention are described by way of hardware elements. However, it is appreciated that these elements may also be software modules that are executable in a computer. The software modules may be stored on a computer readable medium, including but not limited to a USB drive, CD, DVD, computer-readable memory, tape, diskette, floppy disk, and the like. For instance, aspects of the invention may be embodied in a JAVA-based application or the like that runs in a processor or processors. Further, the terms "CPU", "processor", and "controller" are inclusive by nature, including at least one of hardware, software, or firmware. These terms may include a portion of a processing unit in a computer (for instance, in multiple core processing units), multiple cores, a functional processor (as running virtually on at least one of processor or server, which may be local or remote). Further, in network-based gaming systems, the processor may include only a local processor, only a remote server, or a combination of a local processor and a remote server.

It is contemplated that one or more aspects of the invention may be implemented as computer executable instructions on a computer readable medium such as a non-volatile memory, a magnetic or optical disc. Further, one or more aspects of the invention may be implemented with a carrier signal in the form of, for instance, an audio-frequency, radio-frequency, or optical carrier wave.

In the following, description is made in detail on a gaming machine according to the present invention based on an embodiment substantiated in a slot machine 1, with reference to the drawings.

This slot machine 1 comprises an image display device such as a liquid crystal display, etc. The slot machine 1 runs a game by displaying images, etc. of a variety of symbols on the image display device. In other words, the slot machine 1 is a so-called video slot machine.

The slot machine 1 according to this embodiment is a so-called all-scatter type slot machine. And, this slot machine 1 awards a prize determined according to the number of symbols of a same kind to be stopped on a variable display portion 3B (refer to FIG. 14). Now, when a bonus game trigger is realized, the slot machine 1 awards a bonus game to the player (S18). In this bonus game, the slot machine presents three cards (a first card image 130A to a third card image 130C) to the player (refer to FIG. 20). Then, the slot machine 1 awards a prize for the bonus game (e.g., JACKPOT) based on the player's selection (S31).

Now in the bonus game process (S18), the slot machine 1 accepts speech input from the player. Based on the input player's speech, the slot machine 1 identifies a language the player speaks (S22). Based on game history information on the bonus game (refer to FIG. 22), the slot machine 1 outputs an advice message on card selection in the bonus game (S25). Then, the slot machine 1 outputs the advice message in the language identified by the player's language identifying process (S22). This allows the player to reliably understand the content of the advice message. Thus, the player can fully enjoy gaming in the slot machine 1. After outputting an advice message, the slot machine 1 also displays selection confirmation screen. Then, the player can determine and modify his/her own selection. Thus, the player can make a selection of cards based on content of the advice message.

Figure 2:
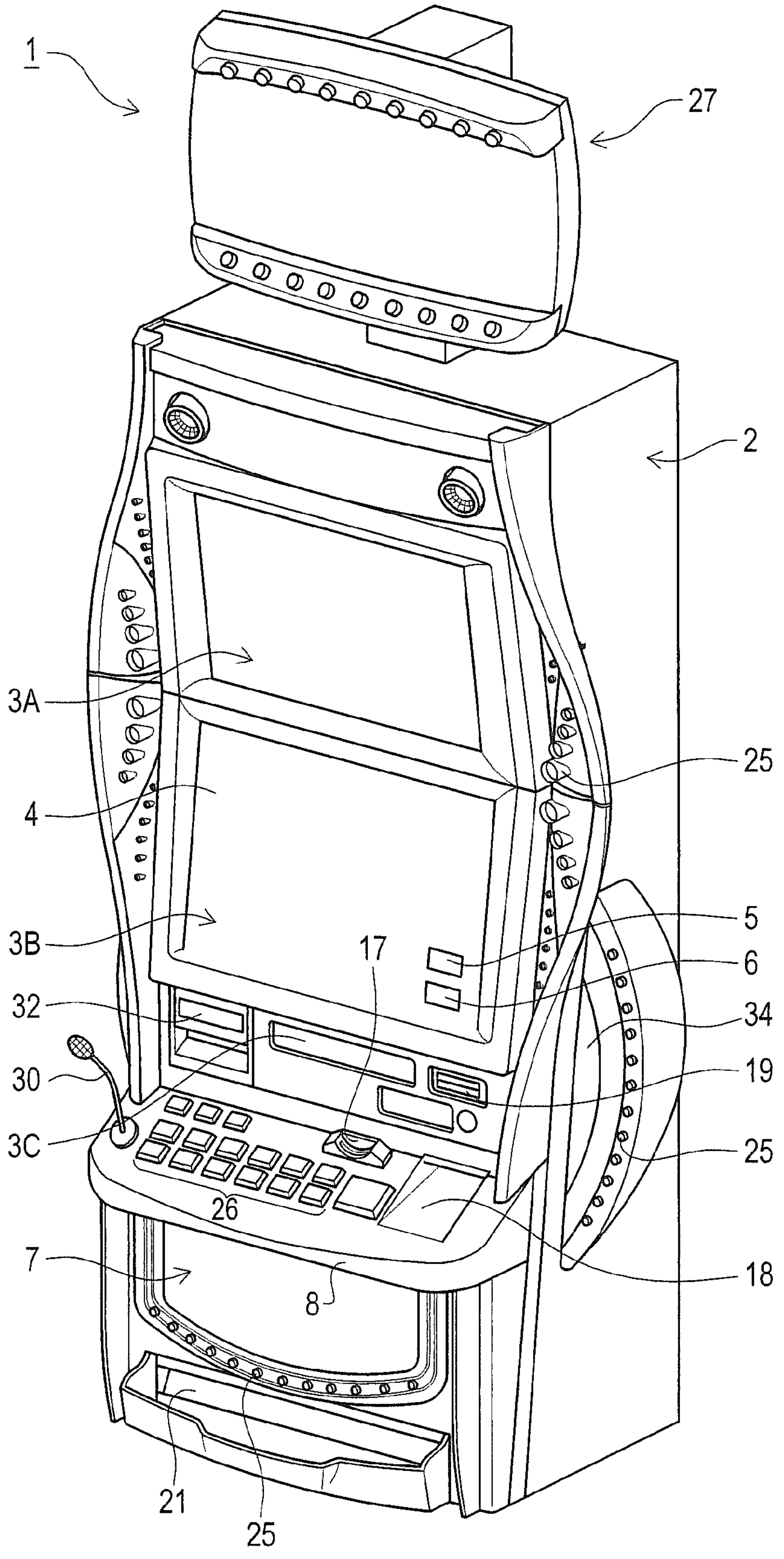
FIG. 2 is an appearance perspective view of a slot machine in one embodiment of the present invention.

In the following, description is made in detail on the schematic configuration of the slot machine 1 according to this embodiment, with reference to the drawings. FIG. 2 is an appearance perspective view of the slot machine 1 according to this embodiment.

The slot machine 1 according to this embodiment is an upright type slot machine to be installed at a game arcades such as a casino, etc. The appearance of the slot machine 1 as shown in FIG. 2 is an example in the present invention and should not to be limited to this appearance.

As shown in FIG. 2, the slot machine 1 has a cabinet 2. The cabinet 2 is a housing in which electrical and/or mechanical components for implementing given gaming aspects are housed.

The slot machine 1 comprises an upper display portion 3A, a variable display portion 3B, and a lower display portion 3C on the front face of the cabinet 2. The upper display portion 3A, the variable display portion 3B and the lower display portion 3C display a variety of gaming information.

The upper display portion 3A is comprised of a liquid crystal display and located in the upper stand of the cabinet 2. The upper display portion 3A displays an effect image, a payout table for a game, game rules, etc.

Figure 3:
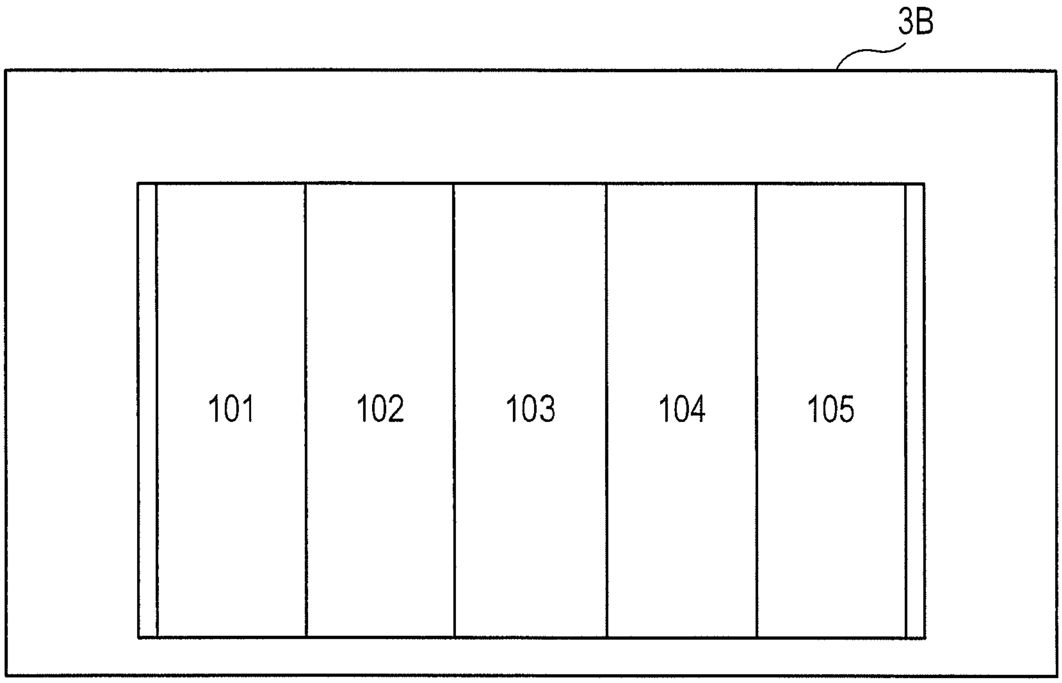
FIG. 3 is an illustration showing a configuration of a reel display portion in the slot machine.
Figure 4:
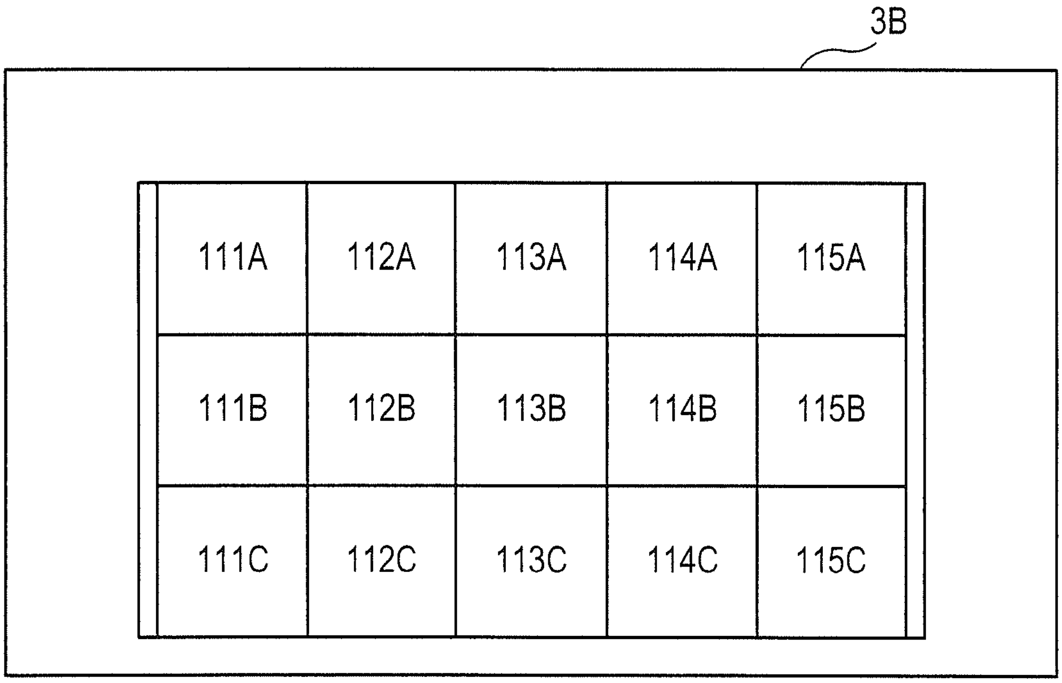
FIG. 4 is an illustration showing symbol display areas of the slot machine.

The variable display portion 3B is comprised of the liquid crystal panel and located in the middle stand of the cabinet 2. The variable display portion 3B has five columns of reel display portions 101 to 105 (Refer to FIG. 3). In each reel display portion, a reel band (Refer to FIG. 9) is variably displayed and stopped. Each of the reel display portions 101 to 105 has three symbol display areas. Specifically, the reel display portions 101 to 105 have, respectively, the symbol display areas 111A to 111C, 112A to 112C, 113A to 113C, 114A to 114C, and 115A to 115C (Refer to FIG. 4). Then, one symbol is displayed on each of the aforementioned respective symbol display areas (Refer to FIG. 11). In other words, fifteen symbols are displayed like a matrix of 3×5 on the variable display portion 3B. The number of reels and that of display symbols per reel display area are variable.

A touch panel 4 is provided on the front face of the liquid crystal panel of the variable display portion 3B. A player can input various instructions by operating the touch panel 4. In fact, the touch panel 4 is used in various operations in a bonus game. In addition, a payout amount display portion 5 and a credit amount display portion 6 are provided on the lower right part of the variable display portion 3B. In this respect, the payout amount display portion 5 and credit amount display portion 6 may be displayed in any location. A bet amount display portion that displays the bet amount can also be provided on the variable display portion 3B. The payout amount display portion 5 displays payouts to be awarded to a player. The credit amount display portion 6 displays the credit amount that a player currently owns.

The lower display portion 3C is comprised of the liquid crystal display and located in a lower stand of the cabinet 2. The lower display portion 3C displays the number of points recorded in a card or the number of points of the game. In addition, when the card is not inserted or reading of the card fails, the lower display portion 3C displays accordingly.

Furthermore, a card reader 19 is located in the periphery of the lower display portion 3C. The card reader 19 reads information stored in a card a player owns.

As described above, in this embodiment, the upper display portion 3A, the variable display portion 3B and the lower display portion 3C are comprised of the liquid crystal display. They, however, are not limited to this aspect. For example, a CRT display, a plasma display, an LED display and any other known display device may comprise the respective variable display portions.

A lower panel 7 is located on the underside of the lower display portion 3C. This lower panel 7 is comprised of a plastic panel on which a picture(s) of character(s) related to the slot machine 1 or names of the slot machine 1, etc. are drawn. In addition, the lower panel 7 is illuminated by backlight. In this respect, the liquid crystal display, the CRT display, the plasma display, the LED display and any other known device may comprise the lower panel 7.

An operation table 8 is provided on the underside of the variable display portion 3B. A variety of operation buttons (e.g., an EXCHANGE button, a CASHOUT button, a HELP button, a BET button, a START button, etc.) are installed on the operation table 8. In addition, a coin insertion slot 17 and bill insertion slot 18 are installed on the operation table 8. A microphone 30 is also located on the operation table 8. The microphone 30 is used when a player inputs speech during a bonus game. In addition, the aforementioned operation buttons may be installed arbitrarily. As necessary, some of the various operation buttons may be deleted, or a new button may be added or replace them.

A coin payout slot and a coin tray 21 are formed in the lower part of the cabinet 2. The coin payout slot is a part into which coins are discharged by input of the EXCHANGE button or the CASHOUT button. The coin tray 21 is a receiver that receives coins discharged from the coin payout slot. A coin detecting portion comprised of a sensor, etc. is installed inside the coin payout slot. The coin detecting portion detects the number of coins to be discharged from the coin payout slot.

Furthermore, light emitting portions 25 are located in the periphery of the cabinet 2 of the slot machine 1. These light emitting portions 25 illuminates in a predetermined illumination pattern, when a prize is won or during a bonus game. In addition, a speaker 34 for outputting speech is provided on the side of the cabinet 2. The light emitting portions 25 and speaker 34 may be located arbitrarily.

As shown in FIG. 2, the slot machine 1 comprises a topper effect device 27 above the cabinet 2. This topper effect device 27 has a shape of rectangular board and is arranged to be almost parallel to the upper display portion 3A. The topper effect device 27 displays a variety of information. In addition, the topper effect device 27 may be shaped arbitrarily.

Figure 5:
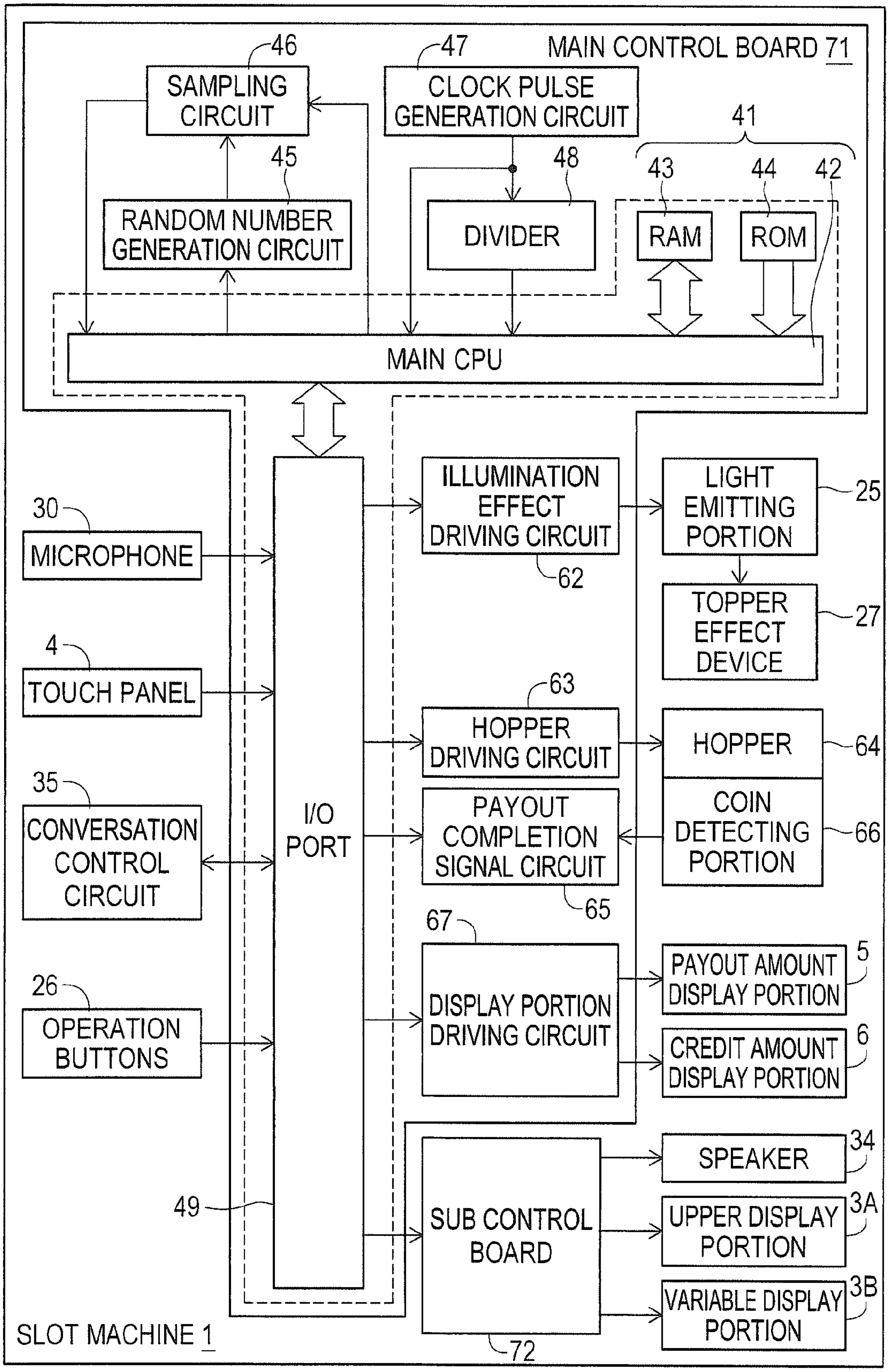
FIG. 5 is a block diagram showing a control system of the slot machine.

In the following, description is made on the internal configuration of the slot machine 1 with reference to drawings. FIG. 5 is a block diagram showing the internal configuration of the slot machine 1. As shown in FIG. 5, the slot machine 1 has a plurality of components. The slot machine 1 has a main control board 71 including a controller 41 as a functional core. The main control board 71 has the controller 41, a random number generation circuit 45, a sampling circuit 46, a clock pulse generation circuit 47, a divider 48, an illumination effect driving circuit 62, a hopper driving circuit 63, a payout completion signal circuit 65 and a display portion driving circuit 67.

The controller 41 comprises a main CPU 42, a RAM 43, and a ROM 44. The main CPU 42 operates in accordance with a program stored in the ROM 44, and controls behavior of the slot machine 1 by inputting/outputting signals to/from other components via an I/O port 49. The RAM 43 stores data or programs to be used when the main CPU 42 operates. For instance, after a game starts, the RAM 43 temporarily stores random number values to be sampled by the sampling circuit 46. The RAM 43 also stores code numbers associated with the respective reel display portions 101 to 105. Furthermore, the RAM 43 stores game history information on a bonus game (Refer to FIG. 22). The contents of the game history information is describe later. The ROM 44 stores a variety of control programs executed by the main CPU 42, and permanent data.

The programs stored in the ROM 44 include a game program and a game system program (hereinafter referred to as game programs, etc.). In addition, the game programs include a lottery program.

This lottery program is executed when code numbers associated with symbols to be stopped in the center positions of the respective reel display portions 101 to 105 of the variable display portion 3B (i.e., the symbol display areas 111B, 112B, 113B, 114B, and 115B) are determined. The lottery program is also used when content of the first card image 130A to the third card image 130C is determined in a bonus game.

In addition, the lottery program includes a symbol weighted data. The symbol weight data shows a correspondence relation between each code number and one or more random number value belonging to a predetermined numerical range (e.g., 0 to 255). In other words, the lottery probability of each symbol on the reel bands is set by associating one code number with one or more random number value. Then, when a random number value is selected by lottery, a symbol to be finally specified from the random number value is displayed in a predetermined area of the variable display portion 3B.

Operating according to instructions of the main CPU 42, a random number generating circuit 45 generates random numbers in a certain range. The sampling circuit 46 selects any random number from those the random number generation circuit 45 generates according to instructions of the main CPU 42, and inputs the selected random number into the main CPU 42. The clock pulse generation circuit 47 generates a reference clock for operating the main CPU 42. The divider 48 inputs to the main CPU 42 a signal obtained by dividing the reference clock by a certain cycle.

Furthermore, the touch panel 4 is connected to a main control board 71. As described above, the touch panel 4 is installed on the front face of a variable display portion 3B, specifies a coordinate position of a part touched by the player. And, the touch panel 4 can determine an operation by the player (e.g., where the player touched, in which direction the touched part moved, etc.) based on the specified coordinate position information. Then, the determined signal is input to the main CPU 42 via the I/O port 49.

In addition, the operations buttons 26 (such as the aforementioned START button, etc.) for instructing on execution of gaming are connected to the main control board 71 by way of operation switches. Thus, a signal responding to pressing operation of the respective operation buttons 26 is input into the main CPU 42 via the I/O port 49.

The microphone 30 and a conversation control circuit 35 are further connected to the main control board 71. As described above, the microphone 30 is used for speech input by a player when a bonus game is executed. Speech input into the microphone 30 is converted into speech data. The speech data is input into the conversation control circuit 35 via the I/O port 49.

The conversation control circuit 35 is used for such operations as identifying a language based on the input speech data or the character data, translating the input speech data or the character data into a predetermined language, etc. The configuration of this conversation control circuit 35 is described later with reference to the drawings.

The illumination effect driving circuit 62 outputs an effect signal according to instructions from the main CPU 42, and causes the light emitting portions 25 and the topper effect device 27 to perform illumination effects. In addition, the topper effect device 27 is connected to the illumination effect driving circuit 62 via the light emitting portions 25.

A hopper driving circuit 63 drives a hopper 64 under the control of the main CPU 42. As a result, the hopper 64 carries out a predetermined operation to payout coins to the coin payout portion. In addition, the coin detecting portion 24 measures the number of coins discharged from the hopper 64, and inputs into the payout completion signal circuit 65 the count data indicative of the number of the measured coins. The payout completion signal circuit 65 receives the coin count data from the coin detecting portion 24, and inputs into the main CPU 42 a signal notifying completion of payout of the coins when the received coin count reaches the set count value. Then, the display portion driving circuit 67 controls display operation of the various display portions such as the payout amount display portion 5, the credit amount display portion 6, etc.

Figure 6:
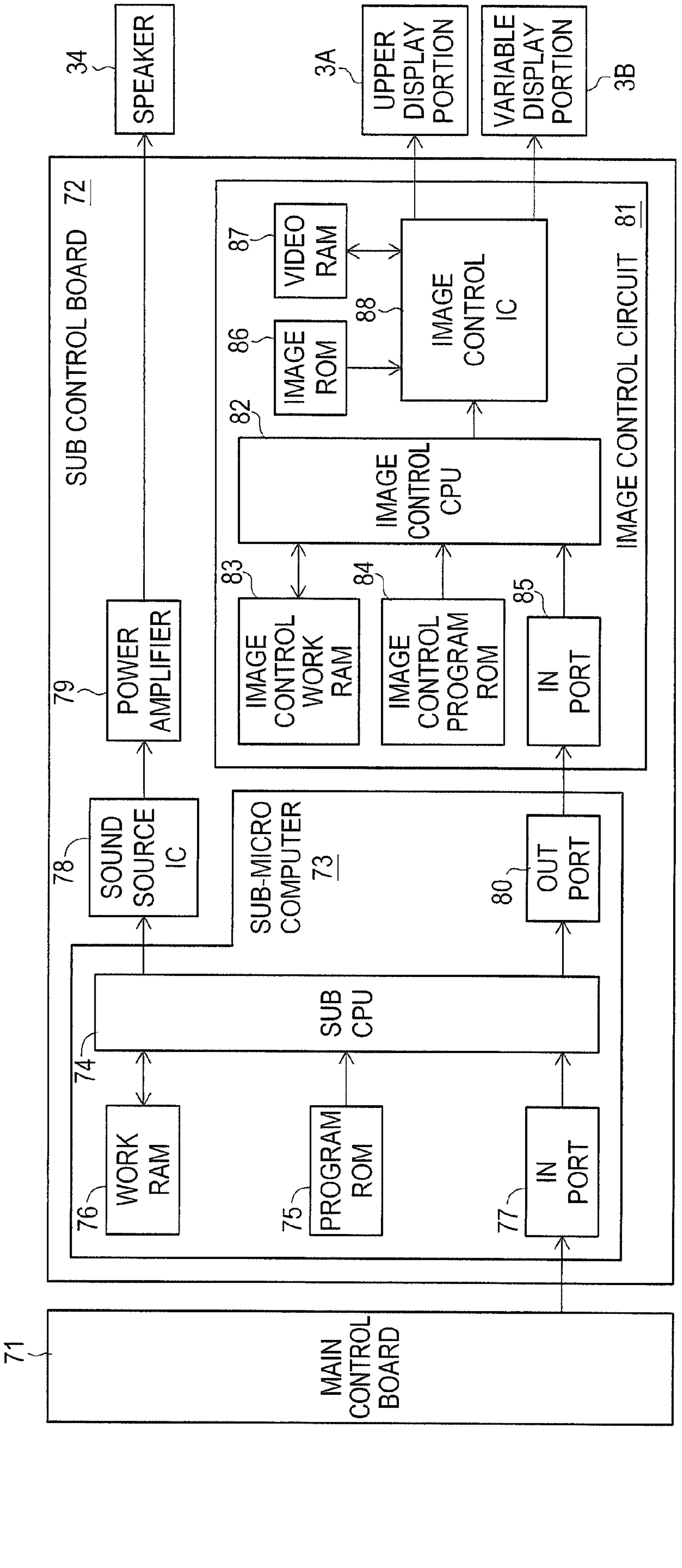
FIG. 6 is a block diagram showing a configuration of a sub control board.

The main control board 71 is connected to the sub-control board 72. As shown in FIG. 6, the sub control board 72 carries out display control of the respective display portions and output control of the audio output by the speaker 34 based on the commands input from the main control board 71. This sub control board 72 is constituted on a separate circuit board from the circuit board that constitutes the main control board 71. The sub control board 72 has a micro computer (hereinafter referred to as "sub micro computer 73") which is provided as a main constituting element. Then, the sub control board 72 has a sound source IC 78, a power amplifier 79 and an image control circuit 81. The power amplifier 79 functions as an amplifier with respect to the audio output from the speaker 34. The image control circuit 81 operates as a display control section for the upper display portion 3A and the main display area 3B.

The sub microcomputer 73 has a sub CPU 74, a program ROM 75, a work RAM 76, and I/O ports 77 and 80. The sub CPU 74 executes the control operation according to a control command transmitted from the main control board 71. The program ROM 75 stores a control program to be executed in the sub CPU 74. The work RAM 76 is configured as a temporary memory when the control program is executed in the sub CPU 74.

The sub control board 72 does not have a clock pulse generation circuit, a divider, a random number generator and a sampling circuit, and executes random number sampling based on an operation program of the sub CPU 74.

The image control circuit 81 has an image control CPU 82, an image control work RAM 83, an image control program ROM 84, an image ROM 86, video RAM 87 and an image control IC 88. The image control CPU 82 determines an image to be displayed on the upper display portion 3A and variable display portion 3B based on parameters set by the sub microcomputer 73 and the image control program.

For example, the image control CPU 82 displays the payout table or help screen on the upper display portion 3A. In addition, the image control CPU 82 variably displays and stops symbols on the respective symbol display areas 111A to 111C, 112A to 112C, 113A to 113C, 114A to 114C and 115A to 115C of the variable display portion 3B. The image control CPU 82 also executes control of the image display in the variable display portion 3B (Refer to FIG. 19) in the bonus game process (S18).

The image control program ROM 84 stores the image control program or various selection tables for display in the upper display portion 3A and the variable display portion 3B. The image control work RAM 83 functions as a temporary memory when the image control program is executed in the image control CPU 82.

An image control IC 88 forms an image corresponding to the content determined by the image control CPU 82 and outputs it to the upper display portion 3A and the variable display portion 3B. The image ROM 86 stores dot data for forming images. In addition, the video RAM 87 functions as a temporary storage device when images are formed by the image control IC 88.

Figure 7:
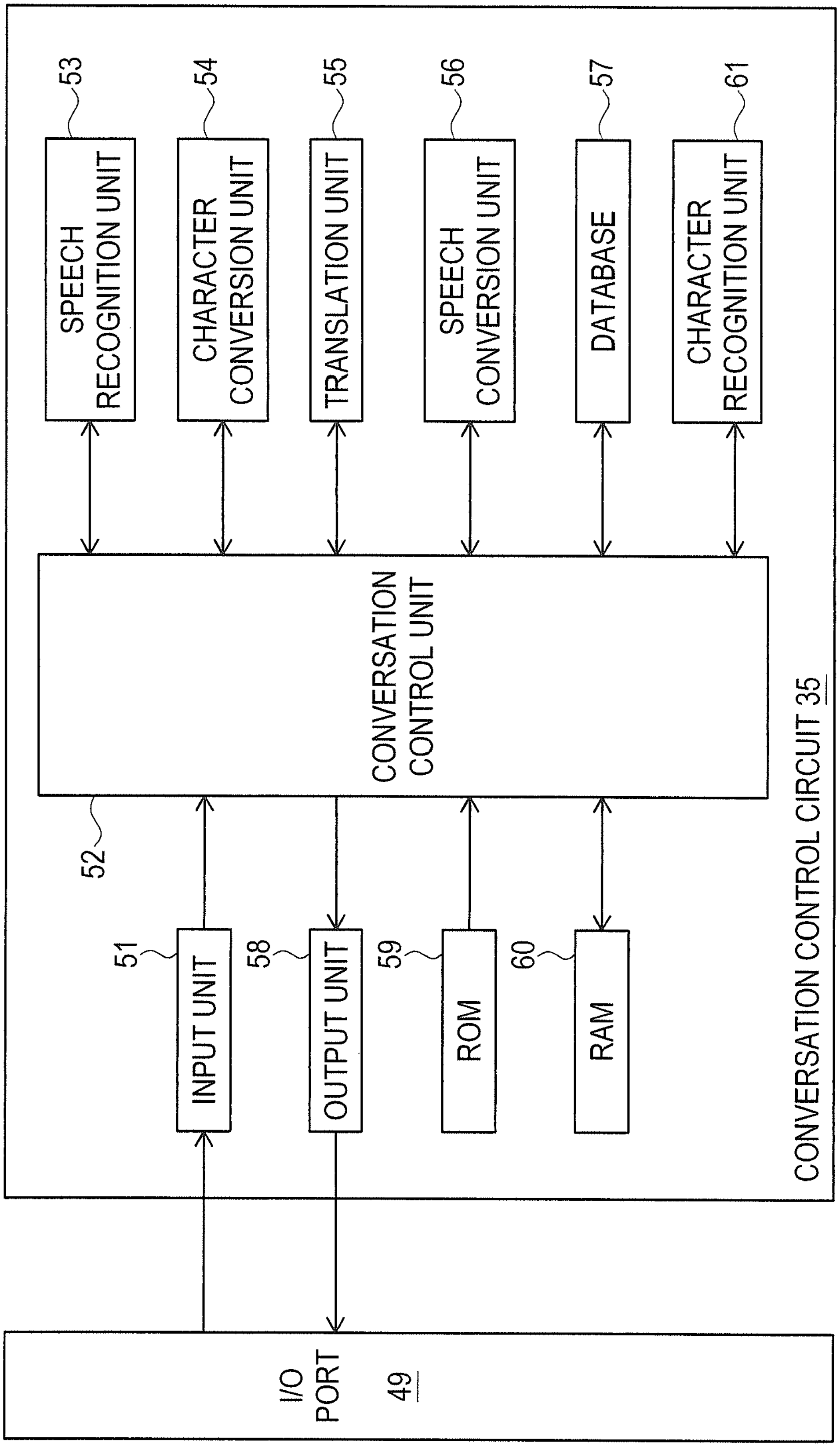
FIG. 7 is a block diagram showing a configuration of a conversation control circuit.

In the following, description is made in detail on the configuration of the aforementioned conversation control circuit 35 with reference to the drawings. FIG. 7 is a block diagram showing configuration of the conversation control circuit 35.

As shown in FIG. 7, the conversation control circuit 35 has an input unit 51, a conversation control unit 52, a speech recognition unit 53, a character conversion unit 54, a translation unit 55, a speech conversion unit 56, a database 57, an output unit 58, a ROM 59, a RAM 60, a character recognition unit 61, etc.

The above input unit 51 accepts input of speech data or character data to the conversation control circuit 35. Thus, the speech data based on speech input by the microphone 30 is input into the input unit 51 via the I/O port 49. The conversation control unit 52 executes control of conversation control circuit 35 based on a control signal from the main CPU 42. The speech recognition unit 53 identifies a language of the speech data based on the input speech data. The character conversion unit 54 converts the speech data into character data.

The translation unit 55 translates character data expressed in a certain language into character data expressed in a language that is different from the language of the character data. The speech conversion unit 56 converts the character data into speech data. The database 57 stores a variety of data necessary for control operations of the speech recognition unit 53, the character conversion unit 54, the translation unit 55, the speech conversion unit 56, the character recognition unit 61, etc. Then, this database 57 stores data on various advice contents to be described later (Refer to FIG. 23). The output unit 58 outputs speech data or character data to the I/O port 49 from the conversation control circuit 35. The speech data output from the output unit 58 is output from the speaker 34 via the sub control board 72. In addition, character data output from the output unit 58 is displayed onto the variable display unit 3B, etc., via the sub control board 72.

The ROM 59 stores various programs, data tables, etc., for executing processes necessary for overall control of the conversation control circuit 35. RAM 60 temporarily stores result of operations computed in the conversation control unit 52. The character recognition unit 61 identifies a language of the character data input into the input unit 51.

Having the above configuration, the conversation control circuit 35 can identify a language of input speech data and character data. Then, the conversation control circuit 35 can translate predetermined content into the identified language and outputs it. The technology related to this conversation control circuit 35 is already known. Thus, detailed description thereof is omitted here.

The aforementioned internal configuration of the slot machine 1 is simply an example, and not to be limited to the above configuration aspect. For example, a memory card or PLD (Programmable Logic Device) can be removably configured. In this case, the slot machine can also be configured to read necessary information from the memory card or PLD.

In addition, the slot machine 1 according to the present invention uses coins, bills or electronic valuable information (credit) equivalent thereto, as a gaming value. However, the gaming value applicable to the present invention is not limited to this, and medals, tokens, electronic money, and tickets can be configured to be available.

In the following, description is made in detail on a reel band that is variably displayed in the reel display portion, with reference to the drawings. As described above, FIG. 8 is a view showing one example of symbols comprising the reel band. FIG. 9 is an illustration showing an example of the reel band.

Figure 8:
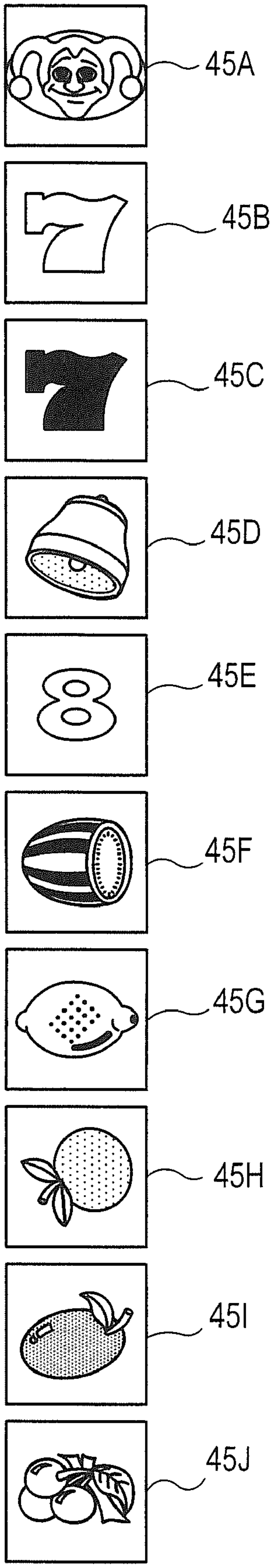
FIG. 8 is an illustration on symbols comprising a reel band.
Figure 9:
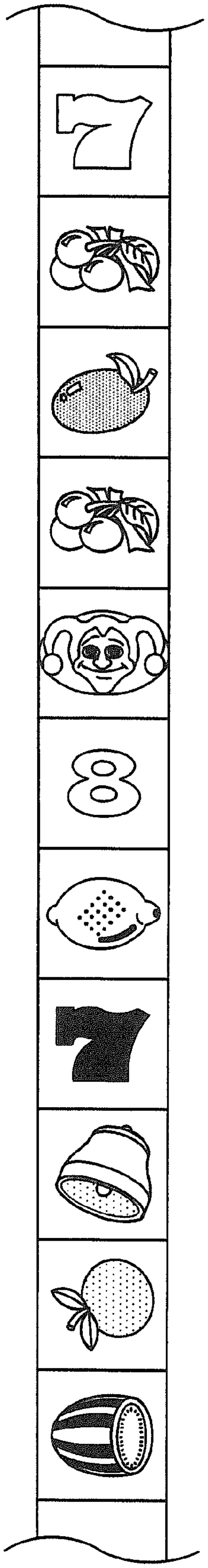
FIG. 9 is an illustration showing one example of a symbol row comprising the reel band.

As shown in FIG. 8 and FIG. 9, the reel band in this embodiment includes a joker symbol 45A (JOKER), a red seven symbol 45B (RED 7), a blue seven symbol 45C (BLUE 7), a bell symbol 45D (BELL), an eight symbol 45E (EIGHT), a watermelon symbol 45F (WATERMELON), a lemon symbol 45G (LEMON), an orange symbol 45H (ORANGE), a plum symbol 45I (PLUM), and a cherry symbol 45J (CHERRY).

Then, as shown in FIG. 9, a variety of symbols as shown in FIG. 8 are illustrated in the reel band in a predetermined sequence. In this respect, the reel band as shown in FIG. 9 is simply an example, and the sequence by which symbols are illustrated is random. In addition, the number of symbols to be illustrated in one reel band is arbitrary and types of symbols to be illustrated are also arbitrary.

In addition, one reel band is associated with the reel display portions 101 to 105 of the slot machine 1 according to this embodiment respectively.

In the following, description is made on a game to be executed on the above slot machine 1. In a game to be executed on the slot machine 1, all symbols are scatter symbols. In other words, in the game in this embodiment, a prize is awarded based on the number of same symbols appearing in the symbol display areas (Refer to FIG. 4) that are shaped as a 3×5 matrix on the variable display portion 3B (Refer to FIG. 12).

When starting a game in the slot machine 1, a player sets the bet amount by operating the BET button and presses the START button.

Figure 10:
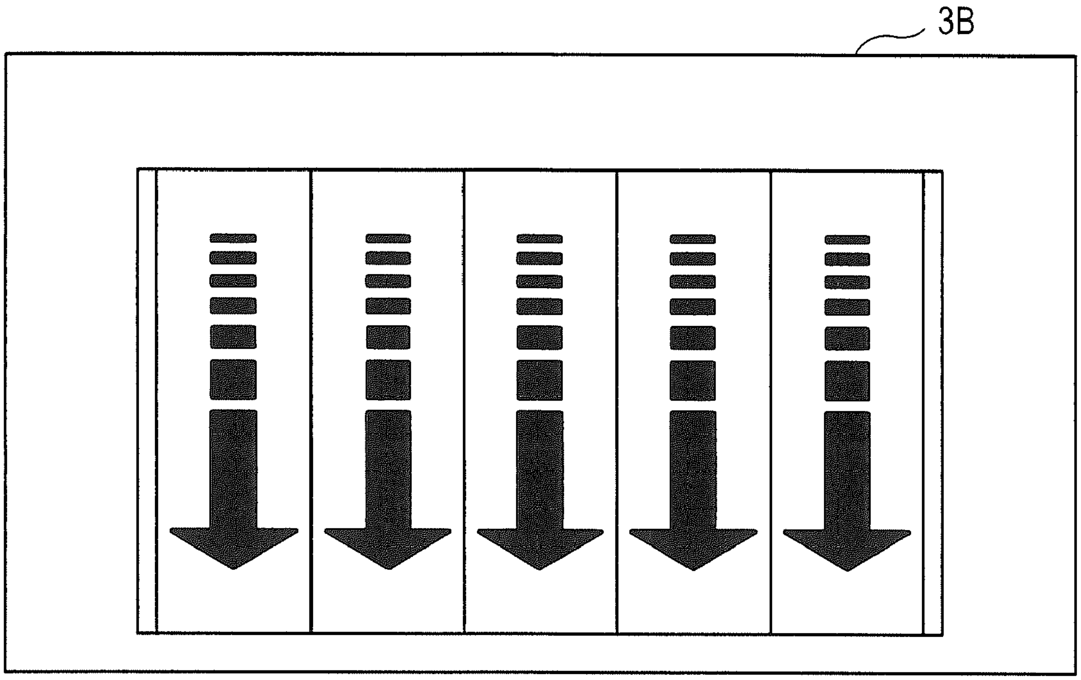
FIG. 10 is an illustration showing a variable display portion where symbols are variably displayed.

Based on the pressing of the START button, the reel bands in the respective reel display portions 101 to 105 rotate. In other words, symbols illustrated on the reel bands are scroll-displayed from up to down in the respective reel display portions 101 to 105 (Refer to FIG. 10).

Figure 11:
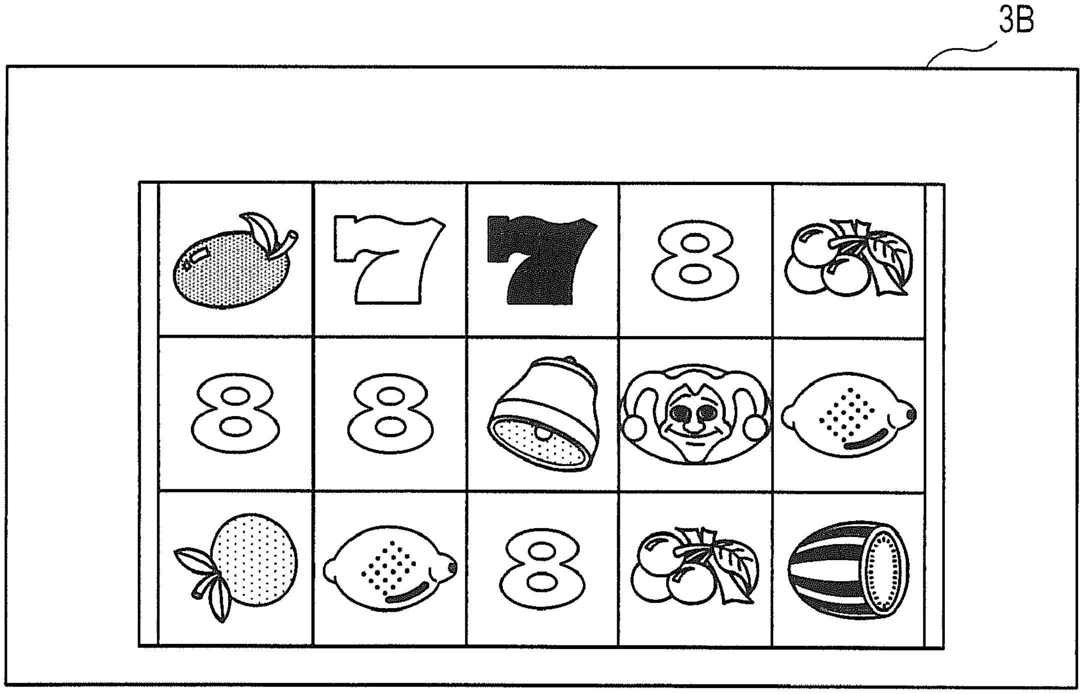
FIG. 11 is an illustration showing the variable display portion where symbols are stopped.

After a predetermined period of time has elapsed, the reel bands are stopped on the respective reel display portions 101 to 105. Accordingly, a part of a symbol sequence that comprises the each reel band (three symbols comprising each reel band) is stopped on the respective reel display portions 101 to 105. In other words, as shown in FIG. 11, each one symbol is stopped on the three symbol display areas comprising each reel display portion. With this, fifteen symbols are stopped on the variable display portion 3B (Refer to FIG. 11).

As described above, in the game in this embodiment, a winning combination is determined based on the number of same symbols displayed in the variable display portion 3B. And, a prize corresponding to the winning combination is awarded. When the player wins the winning combination, the player is awarded with an amount obtained by multiplying the payout corresponding to the winning combination by the bet amount (Refer to FIG. 12), which will be described later.

Now, if three or more JOKER symbols 45A are stopped on the variable display portion 3B, a bonus game trigger is realized. In this case, the player acquires a bonus game (S18). This bonus game will be described in detail later.

In the following, description is made on a winning combination and content of the prize in the slot machine 1 according to the present invention, with reference to the drawings. FIG. 12 is an illustration showing a payout table in this embodiment.

As shown in FIG. 12, in the payout table, a winning combination and a prize to be awarded (i.e., the payout) are associated. In this respect, the payouts in the payout table as shown in FIG. 12 show the payouts when the bet amount is "1". In other words, if the bet amount is "2" or more, the amount obtained by multiplying the payout shown in FIG. 12 by the bed amount is paid out.

For example, when five blue seven symbols 45C are displayed in the fifteen symbol display areas (Refer to FIG. 4) in the variable display portion 3B, "the amount obtained by multiplying 150 credits by the bet amount" is paid out to the player (Refer to FIG. 12).

In addition, if four watermelon symbols 45F are displayed in the fifteen symbol display areas in the variable display portion 3B, "the amount obtained by multiplying 8 credits by the bet amount" is paid out to the player (Refer to FIG. 12). In the following, the payout is set for every winning combination shown in FIG. 12 in a similar manner.

In this respect, if the symbols displayed in the fifteen symbol display areas in the variable display area 3B do not correspond to any of the winning combinations shown in FIG. 12, the player loses. In this case, neither payout nor prize awarding is performed.

Figure 13:
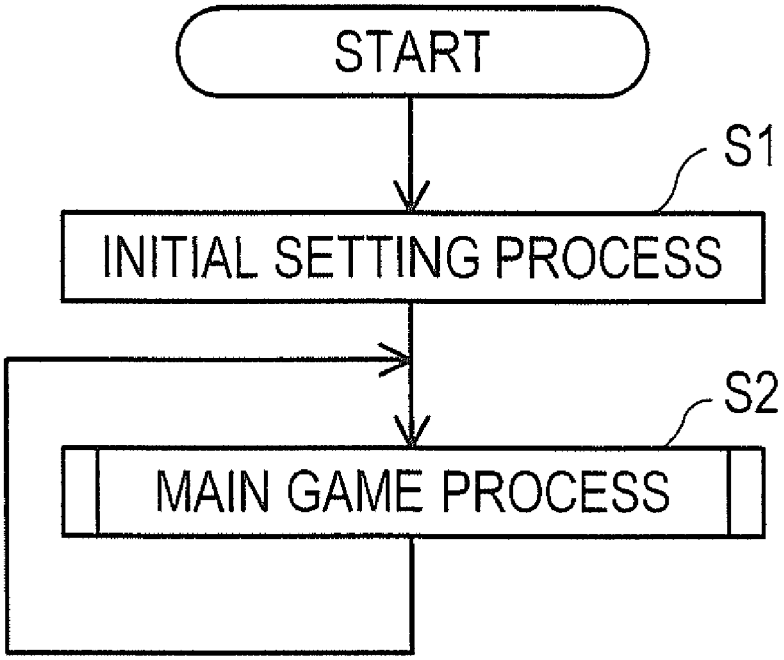
FIG. 13 is a flow chart of a main control program of the slot machine.

In the following, description is made in detail on the main control program to be executed in the slot machine 1 according to this embodiment, with reference to the drawings. FIG. 13 is a flow chart of the main control program.

When the power switch is turned on (the power is turned on), the main control board 71 and the sub control board 72 are started, respectively, and the controller 41 executes an initial setting process (S1). In this initial setting process (S1), the main CPU 42 executes BIOS stored in the ROM 44 and expands the compressed data incorporated in the BIOS in the RAM 43. In executing the BIOS that was expanded in the RAM 43, the main CPU 42 carries out a diagnosis and initialization of the different types of peripheral devices. Further, the main CPU 42 writes the game programs, etc., from the ROM 44 into the RAM 43. The main CPU 42 acquires payout rate setting data and country identification information. While executing the initial setting process (S1), the main CPU 42 also carries out an authentication process with respect to each program.

When the initial setting process (S1) ends, the main CPU 42 executes a main game process (S2). In this main game process (S2), the main CPU 42 sequentially reads the game programs, etc. from the RAM 43 and executes these programs. The slot machine 1 according to the present embodiment carries out the game by executing this main game process (S2).

The main game process (S2) is repeatedly executed while power is supplied to the slot machine 1.

Figure 14:
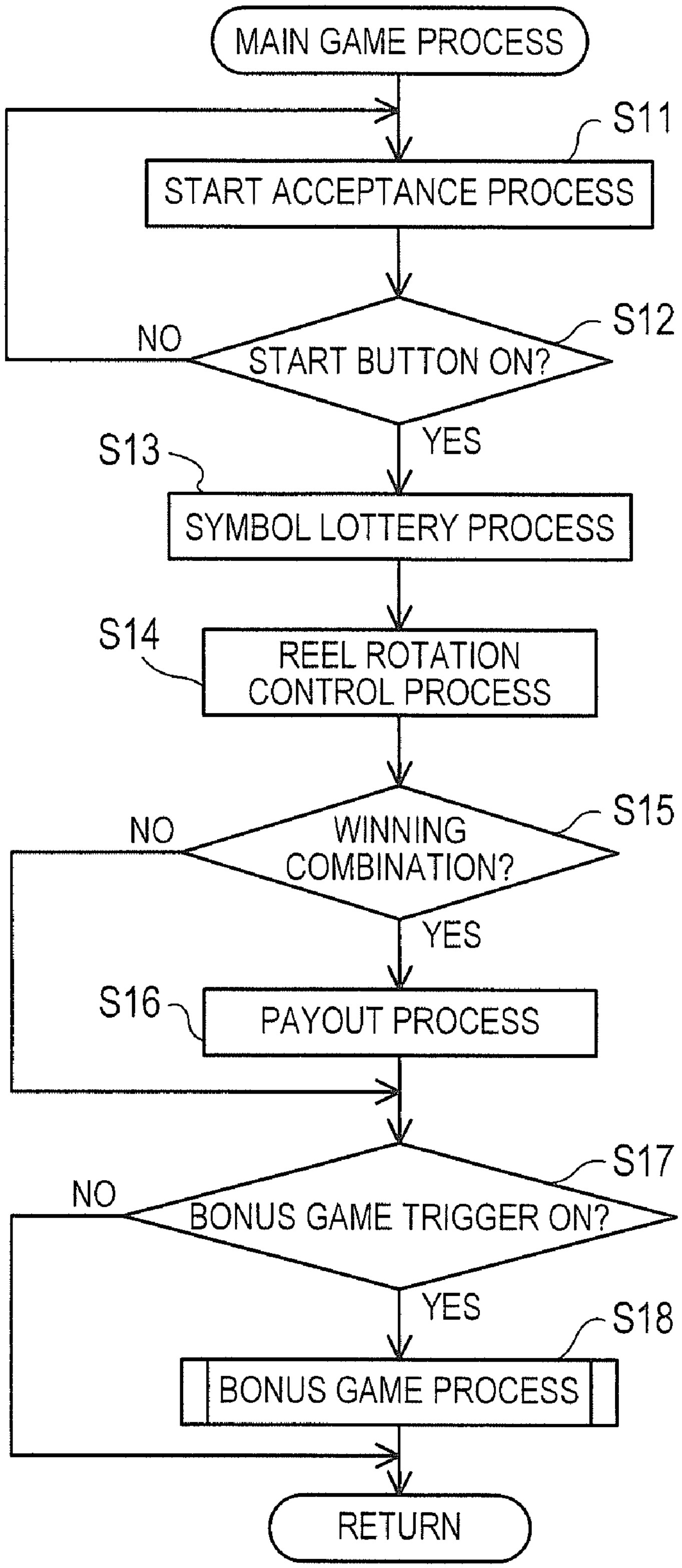
FIG. 14 is a flow chart of a main game processing program of the slot machine.

In the following, description is made on the main game program to be executed in the main game process (S2) with reference to the drawings. FIG. 14 is a flow chart of the main game program in the slot machine 1 according to this embodiment. Each program as shown in the following flow chart is stored in the ROM 44 or the RAM 43 the slot machine 1 is equipped with, and executed by the main CPU 42.

As shown in FIG. 14, the main CPU 42 first executes a start acceptance process (S11). In this start acceptance process (S11), the player inserts coins and carries out a bet operation using the BET button from amongst the operation buttons 26.

After shifting to step S12, the main CPU 42 judges whether the START button from amongst the operation buttons 26 has been depressed or not. The main CPU 42 judges whether or not there was input to the START button, according to whether or not there was a signal based on the pressing of the START button.

If the START button was pressed (S12: YES), the main CPU 42 stores the bet information in the RAM 43. This bet information shows the amount of bets that was set based on the above bet operation. At this time, the main CPU 42 subtracts the above bet amount from the credit amount that the player currently possesses. Then, the main CPU 42 cumulatively accumulates a predetermined percentage of the bet amount to a predetermined storage area formed in the RAM 43. The cumulatively added gaming values comprise JACKPOT in the bonus game process (S18). Then, the main CPU 42 shifts the process to S13.

In contrast, if the START button was not pressed (S12: NO), the main CPU 42 returns the process to the start acceptance process (S11). As a result, the player can carry out an operation to correct, etc. the bet amount.

In S13, the main CPU 42 executes a symbol lottery process. In this symbol lottery process (S13), the main CPU 42 executes the lottery program stored in the RAM 43, thereby sampling a random number value from a predetermined numerical range of random number values. Then, based on the sampled random number values and table, the main CPU 42 determines the symbols to be stopped on the center part of the respective reel display portion (i.e., the symbol display areas 111B, 112B, 113B, 114B, and 115B).

Now description is made on the process using the random number value in the symbol lottery process (S13) based on the drawings. FIG. 15 is one example of the table that associates symbols illustrated in the reel bands with the code numbers. FIG. 16 is one example of the table that associates the random number values with the code numbers.

As described above, in the symbol lottery process (S13), the main CPU 42 samples random number values from a predetermined range of random numbers (e.g., 0 to 65535) by executing the lottery program. Then, the main CPU 42 determines code numbers based on the sampled random number values and the table (Refer to FIG. 16, for example) that associates the random number values with the code numbers. When determining the code numbers, the main CPU 42 then determines symbols to be stopped on the center part of the reel display portion, based on the code numbers and the table (Refer to FIG. 15) that associates the symbols with the code numbers.

For example, when the reel band as shown in FIG. 15 is used for the reel display portion 101, and the random number value "1295" is sampled, the main CPU 42 decides for the code number "10" based on the random number value "1295" and the table shown in FIG. 16. In this case, based on the code number "10" and the table shown in FIG. 15, the main CPU 42 determines that the symbol to be stopped on the symbol display area 111B is the watermelon symbol 45F.

The process using the random number value in the symbol lottery process (S13) is not limited to the instance of using the random number value, the table including associations between the random number values and the code numbers (refer to FIG. 16, for instance) and the table including associations between the symbols and the code numbers (refer to FIG. 15).

For instance, the sampled random number value and the symbols may be directly associated. Alternatively, the sampled random number values and the winning combinations can be directly associated to thereby allow determination of the symbol to be stopped using the table.

Now, referring to FIG. 14 again, description is made on the processes following the symbol lottery process (S13) in the main game processing program. After the symbol lottery process (S13) ends, the main CPU 42 executes a reel rotation control process (S14). In this reel rotation control process (S14), the main CPU 42 variably displays the respective reel bands at a predetermined speed in the reel display portions 101 to 105. Then, the main CPU 42 determines an effect pattern (a pattern of image display to the variable display portion 3B and a pattern of audio output from the speaker 34) to a unit game. Then, the main CPU 42 instructs the sub control board 72 to start effects based on the determined effect pattern. Here, the unit game refers to a game executed in a sequence of processes from when variable display of each reel band starts until all the reel bands are stopped.

When a predetermined time has elapsed, the main CPU 42 stops the reel bands on the reel display portions 101 to 105 in a predetermined order. With this, each one symbol is stopped in the fifteen symbol display areas of the variable display portion 3B (Refer to FIG. 11).

In addition, the reel bands on the reel display portion may be stopped all together or may be stopped sequentially with a time lag therebetween.

The stop-display of symbols is described specifically based on the example of the reel display portion 101 described in the symbol lottery process (S13). According to the aforementioned illustrative embodiment, the watermelon symbol 45F (code number: 10) determined in the symbol lottery process (S13) is stopped on the symbol display area 111B that is the center part of the reel display portion 101. In this case, the orange symbol 45H (code number: 09) is stopped on the symbol display area 111A that constitutes the upper part of the reel display portion 101. Then, the cherry symbol 45J (code number: 11) is stopped on the symbol display area 111C that constitutes the lower part of the reel display portion 101.

After the reel rotation control process (S14), the main CPU 42 judges whether or not the symbols that are stopped on the variable display portion 3B correspond to a winning combination (S15). Specifically speaking, the main CPU 42 specifies the kinds of symbols (i.e., the Joker symbol 45A to the Cherry symbol 45J) that comprise the stopped symbols, based on the code numbers in the respective reel display portions 101 to 105 stored in the RAM 43. And, the main CPU 42 judges whether they correspond to a winning combination.

When a winning combination is realized (S15: YES), the main CPU 42 calculates the payout amount corresponding to the winning combination based on the payout table (Refer to FIG. 12). And, the main CPU 42 shifts the process to S16. On the other hand, if no winning combination is realized (S15: NO), the main CPU 42 shifts the process to S17.

When shifting to S16, the main CPU 42 executes the payout process. In this payout process (S16), the main CPU 42 pays out the payout amount corresponding to the winning combination that was determined in S15. After the payout process (S16) ends, the main CPU 42 shifts the process to S17.

In the following S17, the main CPU 42 judges whether or not a bonus game trigger has been realized. Specifically, based on the code numbers of the respective reel display portions 101 to 105 stored in the RAM 43, the main CPU 42 judges whether or not three or more joker symbols 45A are stopped on the variable display portion 3B.

When a bonus game trigger has been realized (S17: YES), the main CPU 42 shifts the process to the bonus game process (S18). In contrast, when the bonus game trigger has not been realized (S17: NO), the main CPU 42 directly terminates the main game processing program. As described above, the main game processing program is executed again at the same time it terminates.

In the following S18, the main CPU 42 executes the bonus game process. In this bonus game process (S18), the main CPU 42 executes a bonus game processing program to be described later. In the bonus game process (S18), a multiple-choice bonus game is played in which a player selects one card from three cards arbitrarily. Based on the selected card, the player wins a prize for the bonus game (e.g., the aforementioned "JACKPOT"). This bonus game process is described later in detail. After the bonus game process (S18) ends, the main CPU 42 terminates the main game processing program.

As described above, the main game process (S2) is repeatedly executed while power is supplied to the slot machine 1. That is, when the main game processing program ends, the main CPU 42 starts execution of the main game processing program once again.

In the following, description is made in detail on the bonus game processing program to be executed in the bonus game process (S18) with reference to the drawings. FIG. 1 is a flow chart of the bonus game processing program.

When starting execution of the bonus game processing program, the main CPU 42 executes a card content determination process (S21). In this card content determination process (S21), the main CPU 42 associates the content of a prize for the bonus game (any of "JACKPOT" or "NO BONUS") with each of the first card image 130A to the third card image 130C to be displayed on the bonus game screen (Refer to FIG. 20). Specifically, by executing the lottery program, the main CPU 42 samples one random number value from a predetermined range of the random number values. Then, the main CPU 42 determines the content of the cards from the first card image 130A to the third card image 130C based on the sampled random number values and the card content determination table (Refer to FIG. 17). After storing the determined card content into the RAM 43, the main CPU 42 shifts the process to S22.

When shifting to S22, the main CPU 42 executes the player's language identifying process. In this player's language identifying process (S22), the main CPU 42 executes the player's language identifying program. That is, the main CPU 42 encourages the player to input speech into the microphone 30. Then, based on the input player's speech, the main CPU 42 identifies the player's language.

Figure 18:
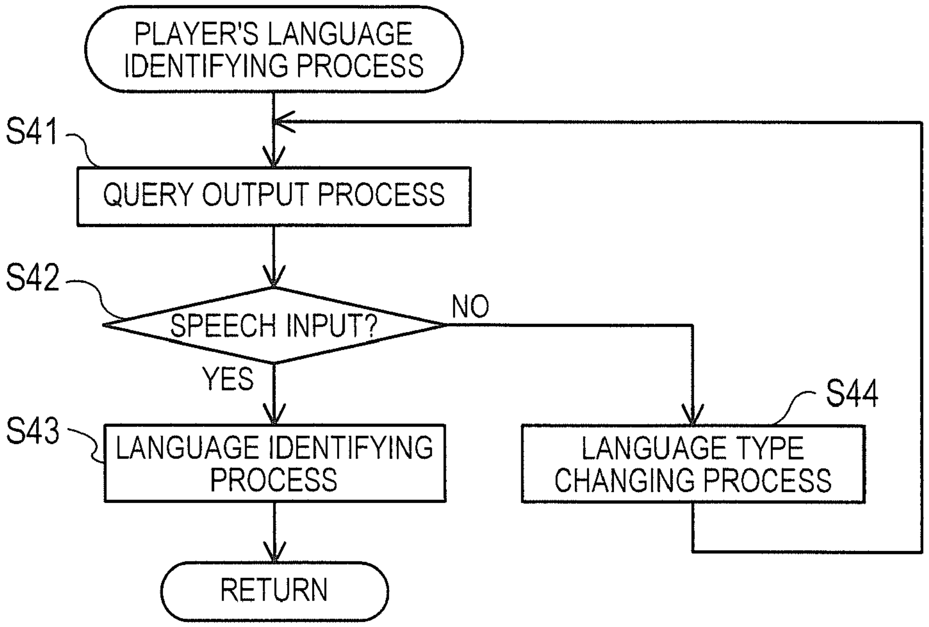
FIG. 18 is a flow chart of a player's language identifying processing program.

Now the player's language identifying process (S22) is described in detail and with reference to the drawings. FIG. 18 is a flow chart of the player's language identifying processing program.

When shifting to the player's language identifying process (S22), the main CPU 42 first executes a query output process (S41). In the query output process (S41), the main CPU 42 outputs a query message to the player by the speech from the speaker 34 and the display on the variable display portion 3B. This query message includes "that a bonus game is started", "that the player is asked whether or not he/she is ready to play a bonus game", and "that the player is requested to input speech of a predetermined phrase to the microphone 30 when starting a bonus game".

Figure 19:
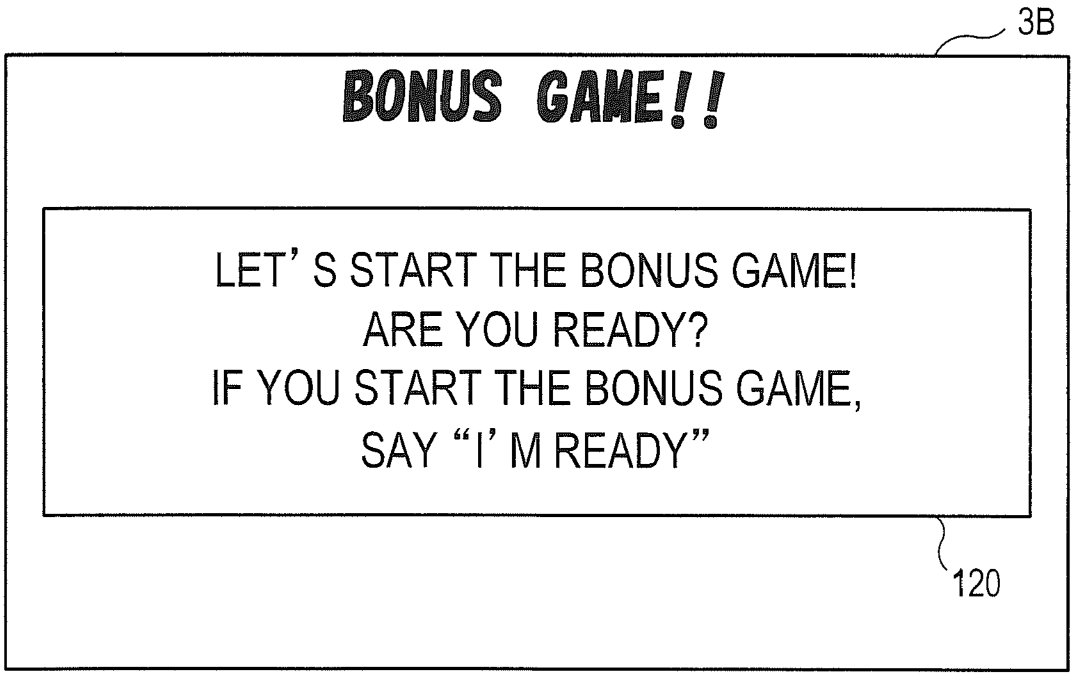
FIG. 19 is an illustration showing one example of the variable display portion that displays query screen.

Specifically, the main CPU 42 displays the query screen (Refer to FIG. 19) on the variable display portion 3B. As shown in FIG. 19, the query screen includes a query display portion 120. The query display portion 120 displays characters that express the above query message, in a predetermined language. In addition, when the query screen is displayed, the main CPU 42 simultaneously makes speech output from the speaker 34 of a query message based on the predetermined language. After the speech output and display output of the query message, the main CPU 42 terminates the query output process.

For instance, outputting the query message in "English", the main CPU 42 makes speech output from the speaker 34 of the messages "Let's start the bonus game!", "Are you ready?", and "If you start the bonus game, Say "I'm ready"", while at the same time displaying the query screen as shown in FIG. 19 in the variable display portion 3B.

After the query output process (S41), the main CPU 42 determines whether or not there was speech input of a predetermined phrase by the player (S42). If there was speech input of a predetermined phrase by the player (S42: YES), the main CPU 42 shifts the process to S43. On the other hand, if there was no speech input of a given phrase by the player (S42: NO), the main CPU 42 shifts the process to S44. In this respect, cases in which speech input of a predetermined phrase did not take place include a case in which a predetermined period of time has elapsed without speech input being performed.

In this embodiment, content of speech input by the player is limited to "predetermined phrases". This is because a player's language can be identified more reliably by limiting the speech input to the "predetermined phrases". In this respect, as far as a player's language can be identified, content of speech input by the player may be changed variously. In fact, the configuration may be such that the player could input speech of free content if the conversation control circuit 35 could identify the player's language.

When shifting to S43, the main CPU 42 executes the language identifying process. In this language identifying process (S43), the main CPU 42 inputs to the conversation control circuit 35 the speech data based on the speech input into the microphone 30. Then, the main CPU 42 identifies a language for the speech data by the conversation control circuit 35. That is, in the conversation control circuit 35, the conversation control unit 52 controls the speech recognition unit 53 based on a signal from the main CPU 42. Herewith, the speech recognition unit 53 identifies a language of the input speech data. Then, the conversation control unit 52 outputs to the main CPU 42 information on the language identified by the speech recognition unit 53 (hereinafter referred to as an identified language). After storing information on the identified language in the RAM 43, the main CPU 42 terminates the player's language identifying processing program.

In contrast, when shifting to S44, the main CPU 42 executes a language type changing process. In this language type changing process (S44), the main CPU 42 changes a language for a query message to be output in the query output process (S41). After changing the language for the query message, the main CPU 42 returns the process to S41. Herewith, in S41, the query message based on the language after changing is output.

For example, when shifting to the language type changing process (S44) after outputting the query message in "English", as shown in FIG. 19, the main CPU 42 changes the language for the query message to "Spanish". Then, whenever the language type changing process (S44) is executed, the language for the query message sequentially changes in the order of "Chinese", "Japanese", "French", and "German" . . . .

Thus, by executing the player's language identifying process (S22), the slot machine 1 can identify a language that can be understood best by a player.

Referring back to FIG. 1 again, description is made in detail on the processes following the player's language identifying process in the bonus game processing program, with reference to the drawings.

Figure 20:
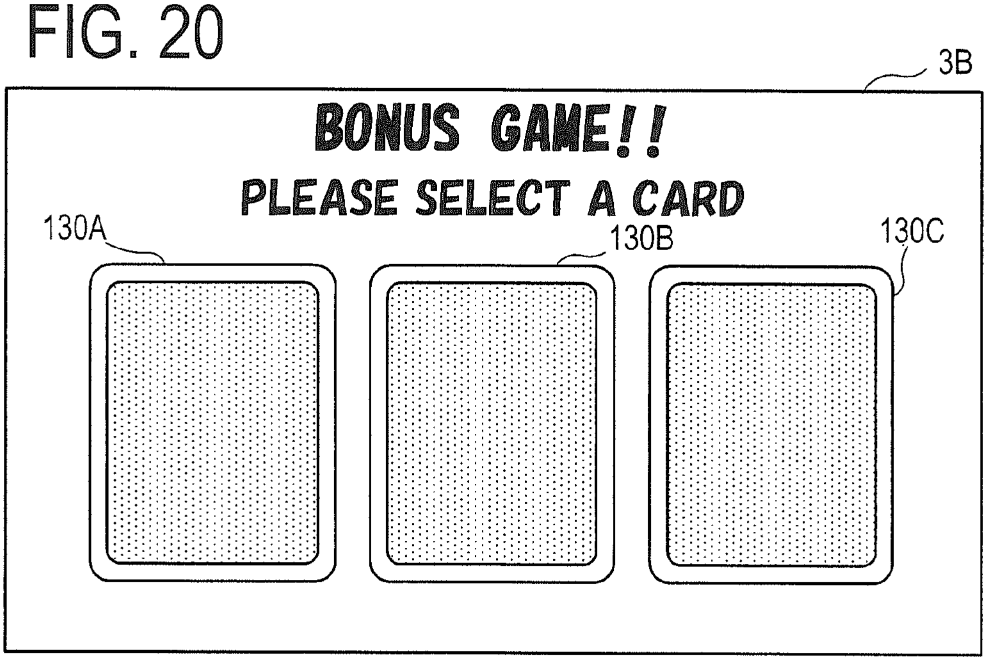
FIG. 20 is an illustration showing one example of the variable display portion that displays bonus game screen.

After the player's language identifying process (S22) ends, the main CPU 42 executes a card display process (S23). In the card display process (S23), the main CPU 42 displays the bonus game screen on the variable display portion 3B by transmitting a control signal to the sub control board 72 (Refer to FIG. 20). As shown in FIG. 20, the bonus game screen includes the first card image 130A, the second card image 130B and the third card image 130C. As described above, the first card image 130A to the third card image 130C are respectively associated with the content of prizes (any of "JACKPOT" and "NO BONUS"). After displaying the bonus game screen, the main CPU 42 shifts the process to S24.

In S24, the main CPU 42 determines whether or not the player performed selection operation. This selection operation is "the operation" to select any of the first card image 130A to the third card image 130C on the bonus game screen. The selection operation is performed by the player pressing the touch panel 4 corresponding to the part on which the player's desired card image is displayed. Thus, the main CPU 42 determines on S24 based on the operation signal from the touch panel 4. If the player performed the selection operation (S24: YES), the main CPU 42 stores information indicating the selected card (hereinafter referred to as a selected card information) in the RAM 43. After that, the main CPU 42 shifts the process to S25. On the other hand, if the player did not perform the selection operation (S24: NO), the main CPU 42 waits till the player performs the selection operation.

When shifting to S25, the main CPU 42 executes an advice information output process. In this advice information output process (S25), the main CPU 42 executes an advice information output processing program. In the advice information output process (S25), based on the game history information on the card selected by the player (hereinafter referred to as a target card), the main CPU 42 calculates a perceived winning probability of the target card. This perceived winning probability shows the perceived probability that "JACKPOT" is associated with the target card (hereinafter referred to as the winning probability). Then, based on the calculated perceived winning probability, the main CPU 42 specifies the advice content to be output to the player. And, the main CPU 42 outputs the advice content.

Figure 21:
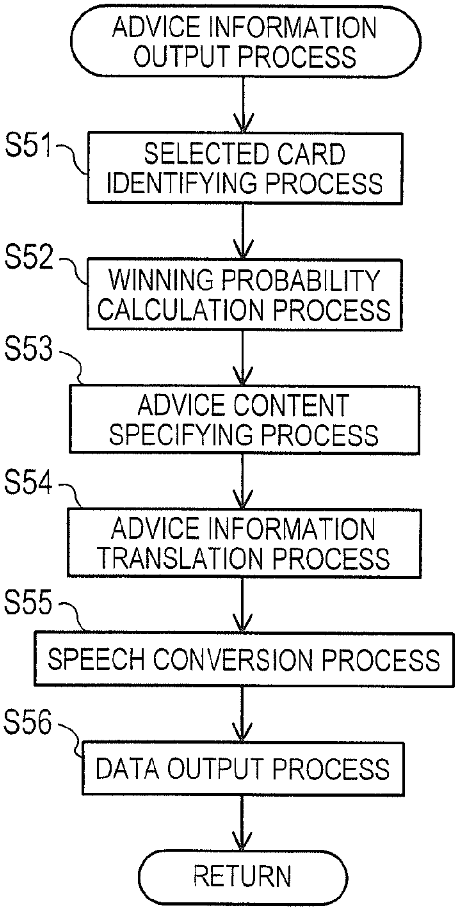
FIG. 21 is a flow chart of an advice information output processing program.

Now, description is made in detail on the advice information output processing program with reference to the drawings. FIG. 21 is a flow chart of the advice information output processing program. When shifting to the advice information output process (S25), the main CPU 42 executes selected card identifying process (S51). In the selected card identifying process (S51), the main CPU 42 identifies the cards that the player selected from the first card image 130A to the third card image 130C based on the operation signal of the selection operation. After storing the information of the target card in the RAM 43, the main CPU 42 shifts the process to S52.

When shifting to S52, the main CPU 42 executes a perceived winning probability calculation process. In the perceived winning probability calculation process (S52), the main CPU 42 refers to the game history information stored in the RAM 43, and calculates the perceived winning probability of the target card.

Specifically, description is made on the content of the perceived winning probability calculation process (S52). As shown in FIG. 22, the game history information consists of the content of a prize for the first card image 130A, that of a prize for the second card image 130B, and that of a prize for the third card image 130C in one bonus game. The game history information is added every time one bonus game is executed (S29). Thus, the RAM 43 stores content of prizes for respective cards in respective bonus games that have been played so far. Hence, by referring to all game history information stored in the RAM 43, the main CPU 42 can calculate the percentage (i.e., perceived winning probability) that "JACKPOT" is associated with the target card (e.g., the first card image 130A). After storing the calculated perceived winning probability of the target card in the RAM 43, the main CPU 42 shifts the process to S53.

In S53, the main CPU 42 executes an advice content specifying process. In this advice content specifying process (S53), the main CPU 42 specifies the content of advice that is subjected to speech output and display output, based on the perceived winning probability for the target card that was calculated in the perceived winning probability calculation process (S52). Specifically, the main CPU 42 specifies an advice pattern based on the perceived winning probability of the target card. This advice pattern consists of a plurality of messages (i.e., advice content) corresponding to the winning probability of the target card. Then, the main CPU 42 determines one advice content that belongs to the specified advice pattern as the advice content of this time. The main CPU 42 stores information on the determined advice content in the RAM 43.

For example, if the perceived winning probability of the target card is 85%, the main CPU 42 specifies the advice content from "advice pattern (1)" (Refer to FIG. 23). The main CPU 42 determines as the advice content of this time the advice content "Recommended very much" that belongs to the "advice pattern (1)".

After the advice content specifying process (S53), the main CPU 42 executes an advice information translation process (S54). In this advice information translation process (S54), the main CPU 42 translates advice content specified in the advice content specifying process (S53) into the identified language identified in the player's language identifying process (S22). After storing the translation result in the RAM 43, the main CPU 42 shifts the process to S55.

Specifically, in the advice information translation process (S54), the main CPU 42 acquires the advice content data specified in the advice content specifying process (S53) from the database 57. The advice content data is the character data expressed in a predetermined language (e.g., Japanese). Then, the main CPU 42 inputs the advice content data, information indicative of the identified language, and control signal into the conversation control circuit 35. Upon receipt of the control signal, the conversation control unit 52 outputs character data (hereinafter referred to as an advice content data for output) that translated the advice content data into the identified language to the main CPU 42, based on the input advice content data and the information indicative of the identified language. After storing the advice content data for output in the RAM 43, the main CPU 42 shifts the process to S55.

When shifting to S55, the main CPU 42 executes a speech conversion process. In this speech conversion process (S55), the main CPU 42 acquires the speech data expressed in the identified language (hereinafter referred to as an advice content data for speech output), based on the advice content data for output obtained in the advice information translation process (S54). After storing the advice content data for speech output to the RAM 43, the main CPU 42 shifts the process to S56.

Specifically, in the speech conversion process (S55), the main CPU 42 inputs the acquired advice content data for output and the control signal into the conversation control circuit 35. When receiving the control signal, the conversation control unit 52 outputs speech data based on the input advice content data for output (i.e., advice content data for speech output) to the main CPU 42, by controlling the speech conversion unit 56. As described above, the advice content data for output is translated into the identified language identified in the player's language identifying process (S22) by the translation unit 55. Thus, the advice content data for speech output is the speech data that is the expression of the advice content data for output in the identified language. After storing the advice content data for speech output in the RAM 43, the main CPU 42 shifts the process to S56.

When shifting to S56, the main CPU 42 executes a data output process. In this data output process (S56), the main CPU 42 inputs into the sub control board 72 the advice content data for output stored in the RAM 43 (i.e., character data), the advice content data for speech output (i.e., speech data), and control signal. Herewith, the slot machine 1 outputs the advice message from the speaker 34 wherein the advice message is a specific advice content (e.g., "Recommended very much") specified in the advice content specifying process (S54) and expressed in the identified language. At the same time, the slot machine 1 displays the advice message expressed in the identified language on the variable display unit 3B. When the data output process (S56) ends, the main CPU 42 terminates the advice information output processing program.

Thus, by executing the advice information output process (S25), the slot machine 1 gives an advice on card selection in a bonus game in a language that a player can understand. Hence, the player can reliably understand the advice and fully enjoy the bonus game.

Referring back to FIG. 1, description is made in detail on processes after the advice information output process (S25) in the bonus game processing program, with reference to the drawings.

After the advice information output process (S25) ends, the main CPU 42 executes confirmation message output process (S26). In this confirmation message output process (S26), the main CPU 42 outputs to the player the confirmation message "that asks whether or not the card selected by the selection operation may be determined". The confirmation message to be output is expressed in the identified language identified in the player's language identifying process (S22). After the confirmation message output process (S22) ends, the main CPU 42 shifts the process to S27.

Specifically, the confirmation message output process (S26) is described. First, the main CPU 42 acquires character data related to the confirmation message from the database 57. Then, the main CPU 42 inputs the acquired character data related to the confirmation message and control signal into the conversation control circuit 35.

As a result of this, by controlling the translation unit 55, the conversation control unit 52 outputs the character data that is the expression of the confirmation message in the identified language (hereinafter referred to as a confirmation message data for output), based on the character data for the confirmation message to the main CPU 42. Furthermore, by controlling the speech conversion unit 56, the conversation control unit 52 outputs the speech data that is the expression of the confirmation message in the identified language (hereinafter referred to as a confirmation message data for speech output), based on the confirmation message data for output to the main CPU 42.

Figure 24:
FIG. 24 is an illustration showing one example of the variable display portion that displays selection confirmation screen.

Then, the main CPU 42 inputs the confirmation message data for output, the confirmation message data for speech output, and the control signal into the sub control board 72. Herewith, the slot machine 1 outputs from the speaker 34 the confirmation message expressed in the identified language, based on the confirmation message data for speech output. The slot machine 1 also displays the selection confirmation screen on the variable display portion 3B (Refer to FIG. 24). The selection confirmation screen includes a confirmation message display part 140. The confirmation message display part 140 displays a confirmation message based on the confirmation message data for output. Thus, the confirmation message display part 140 displays a confirmation message expressed in the identified language. In addition, FIG. 24 shows the case in which the identified language is "English". In this respect, it is needless to say that a language of a message to be displayed in the confirmation message display part 140 differs from the example as shown in FIG. 24, when the identified language is different.

When shifting to S27, the main CPU 42 determines whether or not the player performed a selection fixed operation. Now, as shown in FIG. 24, the confirmation message display part 140 includes an accepting operation part 141. The selection fixed operation is the operation by the player for the accepting operation part 141. In the slot machine 1, the selection fixed operation is performed via the touch panel 4. Thus, the main CPU 42 executes the determination process of S27, based on an operation signal from the touch panel 4. If the player performed the selection fixed operation (S27: YES), the main CPU shifts the process to S28. On the other hand, if the player did not perform the selection fixed operation (S27: NO), the main CPU 42 shifts the process to S32.

Figure 25:
FIG. 25 is an illustration showing one example of the variable display portion that displays game result screen.

In S28, the main CPU 42 executes a selection result judgment process. In the selection result judgment process (S28), the main CPU 42 determines the content of a prize in a bonus game, based on the process result of the card content determination process (S21) and the selection result fixed by the selection fixed operation. Thus, the main CPU 42 determines content of a prize in the bonus game of this time to be either "JACKPOT" or "NO BONUS". Then, the main CPU 42 transmits the content of the prize that is the selection result and the control signal to the sub control board 72. Herewith, the slot machine 1 displays the game result screen (FIG. 25) on the variable display portion 3B. As shown in FIG. 25, the game result screen includes a game result display part 150. The game result display part 150 notifies the game result of a bonus game in an identified language. FIG. 25 shows the case that is the game result screen when the identified language is "English". If the identified language is "other language (e.g., Spanish), the display on the game result display part 150 is expressed in the "other language". After that, the main CPU 42 shifts the process to S29.

When shifting to S29, the main CPU 42 executes a game history update process. In this game history update process (S29), the main CPU 42 adds to the RAM 43 the game history information indicative of prize content of the respective cards (i.e., the first card image 130A to the third card image 130C) determined in the card content determination process (S21). After storing the game history information for the bonus game of this time in the RAM 43, the main CPU 42 shifts the process to S30.

In S30, based on the judgment result of the selection result judgment process (S28), the main CPU 42 determines whether or not there is any payout for the prize related to the bonus game of this time. In other words, the main CPU 42 determines whether or not the prize content of the card selected by the player is "JACKPOT". If the prize content is "JACKPOT" (S30: YES), the main CPU 42 shifts the process to S31. On the other hand, if the prize content is "NO BONUS" (S30: NO), the main CPU 42 directly terminates the bonus game processing program.

When shifting to S31, the main CPU 42 executes a bonus payout process. In this bonus payout process (S31), the main CPU 42 pays out as bonus payout of the gaming value (i.e., JACKPOT) that has been cumulatively added in the RAM 43. When the bonus payout process (S31) ends, the main CPU 42 terminates the bonus game processing program.

In the following, description is made on processes in the case that the player did not perform the selection fixed operation (S27: NO). When shifting to S32, the main CPU 42 determines whether or not the player performed a selection cancellation operation. Now the confirmation message display part 140 includes a cancel operation part 142 (Refer to FIG. 24). The selection cancellation operation is the operation by the player for the cancel operation part 142. In the slot machine 1, the selection cancellation operation is performed via the touch panel 4. Thus, the main CPU 42 executes the determination process of S32, based on an operation signal from the touch panel 4. If the player performed the selection cancellation operation (S32: YES), the main CPU 42 shifts the process to S33. On the other hand, if the player did not perform the selection cancellation operation (S32: NO), the main CPU 42 returns the process to S27.

When shifting to S33, the main CPU 42 executes a selection cancellation process. In this selection cancellation process (S33), the main CPU 42 erases the selected card information stored in S24 from the RAM 43. Herewith, the selection operation performed by the player is canceled. Then, the main CPU 42 returns the process to S24. As a result of this, the player can select a desired card from the first card image 130A to the third card image again.

As described above, the slot machine 1 according to this embodiment awards a bonus game (S18), if a predetermined condition is met (S17: YES) in a normal game (S11 to S16). In the bonus game, the slot machine 1 executes a multiple-choice bonus game wherein any one card of the first card image 130A to the third card image 130C is selected arbitrarily. In the bonus game, the slot machine 1 requests speech input of the player. And, the slot machine 1 identifies the player's language based on the input speech. (S22) Then, the slot machine 1 runs the bonus game using expressions based on the identified player's language. Thus, the slot machine 1 can allow players who speak different languages to fully enjoy a bonus game.

In addition, in a bonus game, the slot machine 1 provides a player with an advice message on the card selection based on the game history related to the bonus game. This advice message is expressed in a language identified based on the player's speech input. Thus, the player can reliably understand the content of the advice message. With this, according to the slot machine 1, even players who speak different languages can select cards based on the content of the advice message. Thus, the slot machine 1 can allow players who speak different languages to enjoy a bonus game more.

Furthermore, the slot machine 1 allows a player to determine and modify his/her card selection after he/she understands the advice message. As a result of this, the player can make the card selection corresponding to the advice message. In fact, the slot machine 1 allows the player to reflect the content of the advice message that he/she understood in the card selection.

It is obvious that the present invention should not be limited to the embodiment, and that various modifications and the variations may be made without departing from the scope of the invention.

For example, the present invention should not be limited to the slot machine according to the aforementioned embodiment. In fact, the present invention can be applied to a variety of gaming machines. For example, it can be applied to the card games such as a poker, etc., or a roulette game, a horse racing game, etc. In addition, the present invention can be applied to a slot machine that uses a mechanical reel.

The number of options in a bonus game is not limited to be three. In other words, the number of options can be changed arbitrarily. In addition, the content of a prize to be awarded in a bonus game is not limited to be the aforementioned two kinds of "JACKPOT" and "NO BONUS". In other words, the present invention can adopt various prize contents such as a prize awarding predetermined payout or a prize awarding another bonus game, etc. In addition, the present invention can adopt two or more kinds of prizes as a kind of prize related to a bonus game.

The advice content to be output in the advice information output process (S25) may be related to the game history. In other words, it should not be limited to information on content related to a selected option. For example, in the aforementioned embodiment, it may be advice on the first card image 130A to third card image 130C (e.g., "Easy to win the first card", etc.).

In addition, the content of the game history information is not limited to be the prize content of the first card image 130A to the third card image 130C determined in the card content determination process (S21). In other words, the game history information can include various types of information, as far as it is information on the game history. For example, the game history information can be configured to include information on whether or not the player fixed selection in the bonus game.

In addition, the present invention can be implemented as a gaming method for executing the processes described above. Additionally, the present invention can be implemented as a program for carrying out the gaming method in a computer and as a recording medium in which the program is recorded.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A gaming machine comprising:

a memory device that stores game history information;

an output device that outputs speech data or character data of commentary information on the game history;

an input device that converts a player's speech into speech data;

a speech recognition device that identifies a language of the speech data;

a character conversion device that converts the commentary information on game history into character data in the identified language, based on the identified language identified by the speech recognition device;

a speech conversion device that converts the character data in the identified language that was converted by the character conversion device, into the speech data of the conversion information on the game history in the identified language, and a computer processor configured to execute steps that include:

(a) a process to execute a first game on the condition that betting of gaming value was performed;

(b) a process to execute a second game that selects a predetermined number of options from a plurality of options with which prize content is respectively associated in a random manner, if the game result of the first game meets a predetermined condition;

(c) a process to present the plurality of options to the player when the second game is started;

(d) a process to accept the player's speech input to the input device;

(e) a process to extract the commentary information on the game history related to the presented plurality of options;

(f) a process to convert the extracted commentary information on the game history into the character data in the identified language identified based on the player's speech, and to output the character data in the identified language to the output device;

(g) a process to convert the character data in the identified language that was converted by the speech conversion device, into the speech data of the commentary information in the identified language on the game history, and to output the speech data to the output device;

(h) a process to accept the player's selection for the plurality of options; and (i) a process to award a prize for the second game, based on the prize content associated with the option selected by the player.

2. The gaming machine of claim 1, wherein the computer processor configured to further executes steps that include:

(j) a process to output to the output device the character data or the speech data of a confirmation message in the identified language based on the player's selection of the options;

(k) a process to fix the selection of the options, when an operation of fixing the selection of the options is performed, corresponding to the output of the confirmation message; and (l) a process to cancel the selection of an option when the operation to cancel the selection of the option is performed, corresponding to the output of the confirmation message.

3. A gaming machine comprising:

a memory device that stores game history information;

an output device that outputs speech data or character data of commentary information on the game history;

an input device that converts a player's speech into speech data;

a speech recognition device that identifies a language of the speech data;

a character conversion device that converts the commentary information on game history into character data in the identified language, based on the identified language identified by the speech recognition device;

a speech conversion device that converts the character data in the identified language that was converted by the character conversion device, into the speech data of the conversion information on the game history in the identified language, and a computer processor configured to execute steps that include:

(a) a process to execute a first game on the condition that betting of gaming value was performed;

(b) a process to execute a second game that selects a predetermined number of options from a plurality of options with which prize content is respectively associated in a random manner, if the game result of the first game meets the predetermined condition;

(c) when the second game is started, a process to randomly associate any of the first prize content in which a prize to be awarded is defined or the second prize content in which no prize is awarded, with the plurality of options, respectively;

(d) a process to present the plurality of options to the player when the second game is started;

(e) a process to accept the player's speech input to the input device;

(f) a process to accept the player's selection to the plurality of options;

(h) a process to calculate the perceived probability that the first prize is associated with the option, based on the game history information stored in the memory device, and to extract commentary information on the game history associated with the calculated perceived probability;

(i) a process to convert the extracted commentary information on the game history into character data in the identified language identified based on the player's speech, and to output the character data in the identified language to the output device;

(j) a process to convert the character data in the identified language that was converted by the speech conversion device, into speech data of the commentary information in the identified language on the game history, and to output the speech data to the output device; and (k) a process to award a prize for the second game depending on the selection result of the options by the player.

4. The gaming machine of claim 3, wherein the computer processor configured to further executes steps that include:

(l) a process to output to the output device the character data or the speech data of a confirmation message in the identified language if there is the player's selection for the options;

(m) a process to be fixed the selection of the options, when the operation to be fixed the selection of the options is performed, corresponding to the output of the confirmation message; and (n) a process to cancel the selection of the option when the operation to cancel the selection of the option is performed, corresponding to the output of the confirmation message.

* * * * *